(12) United States Patent
Kawamura

(10) Patent No.: US 7,353,335 B2
(45) Date of Patent: Apr. 1, 2008

(54) STORAGE CONTROL METHOD FOR DATABASE RECOVERY IN LOGLESS MODE

(75) Inventor: Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 198 days.

(21) Appl. No.: 11/396,644

(22) Filed: Apr. 4, 2006

(65) Prior Publication Data

US 2007/0185924 A1    Aug. 9, 2007

(30) Foreign Application Priority Data

Feb. 3, 2006 (JP) ............................. 2006-026676

(51) Int. Cl.
*G06F 17/30* (2006.01)
*G06F 3/06* (2006.01)
*G06F 12/00* (2006.01)
(52) U.S. Cl. ........................ 711/114; 711/162; 707/202; 707/204; 714/6
(58) Field of Classification Search ..................... None
See application file for complete search history.

(56) References Cited

U.S. PATENT DOCUMENTS 5,640,561 A    6/1997    Satoh et al.

6,912,632 B2 *    6/2005    Mori .......................... 711/162
2004/0107325 A1 *    6/2004    Mori .......................... 711/162
2006/0129608 A1 *    6/2006    Sato et al. .................. 707/200

OTHER PUBLICATIONS

"Transaction Processing: Concepts and Techniques," by Jim Gray and Andreas Reuter, Morgan Kaufmann Publishers, 1993.

* cited by examiner

*Primary Examiner*—Kevin Verbrugge
(74) *Attorney, Agent, or Firm*—Antonelli, Terry, Stout & Kraus, LLP.

(57) ABSTRACT

The present invention is constituted so as to enable the recovery of a database even when a log comprising a DB update history is not created. When executing a transaction in the logless mode, a logless-start log is created and written to a primary log VOL 55A at the start of this transaction, and this logless-start log is also written to a secondary log VOL 55B. Thereafter, batch processing is carried out for a DB of a primary DB VOL 51A, and while this transaction is being executed, the pair-split state of the DB VOL is cancelled either prior to the start or after the end of the batch processing, and if the difference between the DB VOLs is eliminated subsequent to the end of batch processing, a logless-end log is created and written to the primary log VOL 55A, and this log is also written to the secondary log VOL 55B.

18 Claims, 12 Drawing Sheets

FIG. 3A

| DATABASE AREA ID | FILE ID | CLASSIFICATION | PRIMARY CONTROLLER ID | PRIMARY PHYSICAL DEVICE ID (LUN) | SECONDARY CONTROLLER ID | SECONDARY PHYSICAL DEVICE ID (LUN) |
|---|---|---|---|---|---|---|
| DBAREA1 | FILE11 | DB | CTL#A1 | VOL11-A | CTL#B1 | VOL11-B |
| DBAREA2 | FILE21 | DB | CTL#A1 | VOL11-A | CTL#B1 | VOL11-B |
| LOG1 | FILE31 | LOG | CTL#A1 | VOL12-A | CTL#B1 | VOL12-B |
| LOG2 | FILE32 | LOG | CTL#A2 | VOL22-A | CTL#B2 | VOL22-B |
| STATUS1 | FILE41 | STATUS | CTL#A2 | VOL21-A | CTL#B2 | VOL21-B |

FIG. 3B

| COPY MODE | PRIMARY CONTROLLER ID | LUN | SECONDARY CONTROLLER ID | LUN |
|---|---|---|---|---|
| SYNCHRONOUS | CTL#A1 | VOL11-A | CTL#B1 | VOL11-B |
| ASYNCHRONOUS | CTL#A1 | VOL12-A | CTL#B1 | VOL12-B |
| SYNCHRONOUS | CTL#A2 | VOL21-A | CTL#B2 | VOL21-B |
| ASYNCHRONOUS | CTL#A2 | VOL22-A | CTL#B2 | VOL22-B |

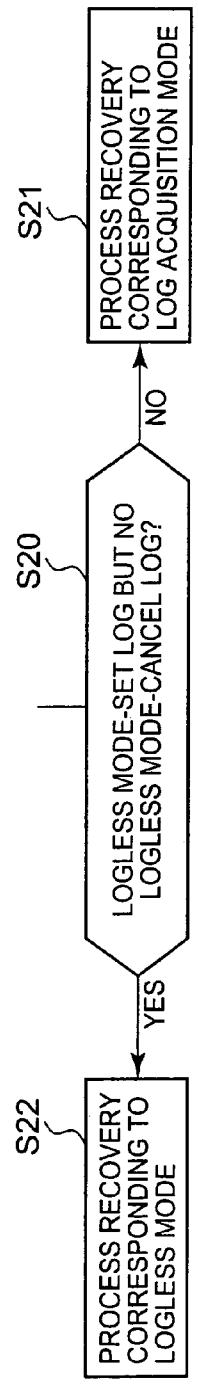

| CASE<br>MALFUNCTION TIMING | FIG. 7 | FIG.'S 8, 10, 11 |
|---|---|---|
| TRANSACTION START ~ DB UPDATING START | NO PARTICULAR RECOVERY PROCESS | NO PARTICULAR RECOVERY PROCESS |
| DB UPDATING START ~ DB UPDATING END | COPY SECONDARY DB VOL TO PRIMARY STORAGE SUBSYSTEM | RECOVER USING BACKUP |
| DURING RE-PAIRING | CANCEL LOGLESS MODE | SPLIT AND CANCEL LOGLESS MODE |
| DURING SPLITTING |  | SPLIT AND CANCEL LOGLESS MODE |
| LOGLESS CANCEL ~ TRANSACTION END | NO PARTICULAR RECOVERY PROCESS | NO PARTICULAR RECOVERY PROCESS |

…

STORAGE CONTROL METHOD FOR DATABASE RECOVERY IN LOGLESS MODE

CROSS-REFERENCE TO PRIOR APPLICATION

This application relates to and claims priority from Japanese Patent Application No. 2006-26676, filed on Feb. 3, 2006 the entire disclosure of which is incorporated herein by reference.

BACKGROUND OF THE INVENTION

1. Field of the Invention

The present invention relates to a storage control method in a storage system having a database.

2. Description of the Related Art

For example, in a storage system, which stores a database (hereinafter, DB), there are times when a technique called disaster recovery is employed in preparation for a malfunction. This is a technique in which the data of a certain site is stored in advanced as a replication of another, geographically separate site, and when there is a disaster-caused malfunction at a certain site, work is restored at another site.

Either synchronous remote copying or asynchronous remote copying is carried out between the sites. In synchronous remote copying, data is transferred to a certain site synchronously with the updating of this data at another site. In asynchronous remote copying, data is transferred to a certain site asynchronously with the updating of this data at another site.

According to the disclosure announced in U.S. Pat. No. 5,640,561, with regard to asynchronous remote copying, there is a system, which guarantees that the sequentiality of a data write coincides at the original site (can also be called the primary site) and the duplicate site (can also be called the secondary site), and a system that does not guarantee this. The sequentiality of this data write must be guaranteed in order to avoid a situation in which a transaction-in-progress state remains, making it impossible to guarantee database consistency. The constitution can be such that this sequentiality guarantee is effective for a plurality of disk groups. U.S. Pat. No. 5,640,561 discloses technology for guaranteeing sequentiality for groups of log (journal) disks and DB disks.

In a storage system that stores a DB, DB disks for storing data itself, and log disks for chronologically storing DB update history information can be provided. When the host computer at the primary site fails due to a disaster or other such occurrence, data on a DB disk can constitute a half-finished update state, but the DB update history information on a log disk is restored to its original consistent state when the DBMS (database management system) inside the host computer is restarted (This kind of technology is disclosed in non-patent literature 1). That is, when a host computer fails, update data for a completed transaction is mirrored to a DB disk (roll forward), and update data for a transaction, which was incomplete when a server failed, is cancelled (roll back).

Patent Literature 1: U.S. Pat. No. 5,640,561 Non-patent Literature 1: "Transaction Processing: Concepts and Techniques, by Jim Gray and Andreas Reuter, Morgan Kaufmann Publishers.

A DBMS, in addition to the status related to a transaction (hereinafter, transaction status, for example, commenced or committed), incorporates in a log it prepares the update history of a DB (hereinafter, DB update history, for example, what is written in which block). Thus, even if the primary site fails, the secondary site can restore the DB using the log of the DB update history copied from the primary site to the secondary site.

However, there are times when processing, in which the number of DB updates within a certain time period is greater than a certain number (hereinafter, multi-updating) is carried out. Batch processing can be raised as a typical example of multi-updating.

In batch processing and other such multi-updating, when a log comprising both a transaction status and a DB update history is created every time a DB is updated, the speed of multi-updating slows down.

Accordingly, a method for alleviating this might be to not incorporated at least a DB update history in a log that is created.

However, simply using this method makes log-based DB recovery impossible because the DB update history is not incorporated into the log.

SUMMARY OF THE INVENTION

Therefore, an object of the present invention is to enable database recovery to be carried out even when a log comprising a DB update history is not prepared.

For example, a storage system comprises a first storage subsystem and a second storage subsystem. The above-mentioned first storage subsystem comprises a first DB storage device capable of storing a database, and a first log storage device capable of storing a log of the above-mentioned database. The above-mentioned second storage subsystem comprises a send DB storage device, which can be paired with the above-mentioned first DB storage device, and a second log storage device, which can be paired with the above-mentioned first log storage device.

The above-mentioned first storage subsystem is constituted such that, when a DB-pair state, which is the pair state of the above-mentioned first DB storage device and the above-mentioned second DB storage device, is a pair-split state, and a difference occurs between the above-mentioned first DB storage device and the above-mentioned second DB storage device, this difference is managed, and when this pair-split state is cancelled, the above-mentioned first storage subsystem, by sending the above-mentioned managed difference to the above-mentioned second storage subsystem, can cause this difference to be updated in the above-mentioned second DB storage device, thereby doing away with the difference between the above-mentioned first DB storage device and the above-mentioned second DB storage device.

In the above-mentioned constitution, when, as a log control mode, which is a mode related to controlling a log of a database, are provided a logless mode, which is a mode in which a log comprising at least the update history of the above-mentioned database is not created even if this database is updated during a transaction, and a mode, which differs from the above-mentioned logless mode, and a transaction is executed in the above-mentioned logless mode, a storage control method according to the present invention comprises the steps of creating at the start of this transaction a logless-start log, which is a log denoting the start of the above-mentioned logless mode, and writing this logless-start log to the above-mentioned first log storage device by issuing logless-start lo to the above-mentioned first log storage device; sending the above-mentioned logless-start log, which is written to the above-mentioned first log storage device, to the above-mentioned second storage subsystem from the above-mentioned first storage subsystem, thereby writing this logless-start log to the above-mentioned second log storage device; executing DB updating for updating a plurality of times the database of the above-mentioned first DB storage device by issuing a plurality of data respectively to this database; canceling a pair-split state between the above-mentioned first DB storage device and the above-mentioned second DB storage device either prior to the start or subsequent to the completion of the above-mentioned DB updating while a transactionin-progress is being executed; creating a logless-end log, which is a log denoting the termination of said logless mode, and writing this logless-end log to the above-mentioned first log storage device when the difference between the above-mentioned first DB storage device and the above-mentioned second DB storage device has been done away with subsequent to the end of the above-mentioned DB updating; and writing the above-mentioned logless-end log, which is written to the above-mentioned first log storage device, to the above-mentioned second log storage device by sending this logless-end log to the above-mentioned second storage subsystem from the above-mentioned first storage subsystem.

The respective storage devices can be physical storage devices (for example, a hard disk drive or other such storage media-mountable media drive), and logical storage devices established using storage regions of a physical storage device (for example, a logical volume).

In a first embodiment, a first system, which comprises the above-mentioned first storage subsystem, can comprise a database management unit for managing the above-mentioned database, and a first storage controller for controlling copying in accordance with the respective storage device pair states. The above-mentioned second storage subsystem can comprise a second storage controller capable of communicating with the above-mentioned first storage controller. Of the above-mentioned database management unit and first storage controller, at least the first storage controller can be provided in the above-mentioned first storage subsystem. A log-pair state, which is a pair state between the above-mentioned first log storage device and the above-mentioned second log storage device, can constitute a synchronous/asynchronous pair state in which data written to the above-mentioned first log storage device is transferred to the above-mentioned second log storage device either synchronously or asynchronously with a write to a prescribed region of the above-mentioned first storage subsystem prior to the commencement of a transaction in the above-mentioned logless mode. The above-mentioned database management unit can create the above-mentioned logless-start log, and write this log to the above-mentioned first log storage device. Because the above-mentioned log-pair state constitutes a synchronous/asynchronous pair state, the above-mentioned first storage controller can send the above-mentioned logless-start log, which was written to the above-mentioned first log storage device, to the above-mentioned second storage controller, and the above-mentioned second storage controller can write the logless-start log from the above-mentioned first storage controller to the above-mentioned second log storage device. The above-mentioned database management unit can execute the above-mentioned DB updating. While a transaction-in-progress is being executed, the above-mentioned database management unit can cancel the pair-split state between the above-mentioned first DB storage device and the above-mentioned second DB storage device either prior to commencement or subsequent to completion of the above-mentioned DB updating. When the difference between the above-mentioned first DB storage device and the above-mentioned second DB storage device has been done away with subsequent to the end of the above-mentioned DB updating, the above-mentioned database management unit can create a logless-end log, which is a log denoting the termination of the above-mentioned logless mode, and can write this logless-end log to the above-mentioned first log storage device. Because the above-mentioned log-pair state constitutes a synchronous/asynchronous pair state, the above-mentioned first storage controller can send the above-mentioned logless-end log, which was written to the above-mentioned first log storage device, to the above-mentioned second storage controller, and the above-mentioned second storage controller can write the above-mentioned logless-start log from the above-mentioned first storage controller to the above-mentioned second log storage device.

In a second embodiment, at least the above-mentioned logless-start log and the above-mentioned logless-end log can be transferred to the above-mentioned second log storage device synchronously with a write to a prescribed region of the above-mentioned first storage subsystem (for example, the first log storage device) between the start and end of a transaction in the above-mentioned logless mode.

In a third embodiment, when data to be written to the above-mentioned database is temporarily stored in memory, and the above-mentioned database is updated by writing the data stored in this memory to the above-mentioned first DB storage device, after the above-mentioned logless-start log has been issued to the above-mentioned first log storage device, unmirrored data, which is data that is not written to the above-mentioned database, can be written to the above-mentioned first DB storage device from the above-mentioned memory prior to the start of the above-mentioned DB updating, and the above-mentioned DB updating can be commenced subsequent to completion of the this write.

In a fourth embodiment, when the above-mentioned DB-pair state constitutes a synchronous/asynchronous pair state in which data written to the above-mentioned first DB storage device is transferred to the above-mentioned second DB storage device either synchronously or asynchronously with a write to a prescribed region of the above-mentioned first storage subsystem, the above-mentioned logless-start log can be written to the above-mentioned first log storage device. The above-mentioned unmirrored data can be written from memory to the above-mentioned first DB storage device, and, by so doing, the above-mentioned unmirrored data, which is written to the above-mentioned first DB storage device, can be sent from the above-mentioned first storage subsystem to the above-mentioned second storage subsystem, and written to the above-mentioned second log storage device. The above-mentioned DB-pair state can be converted from the synchronous/asynchronous pair state to the above-mentioned pair-split state subsequent to the above-mentioned unmirrored data being written to both the above-mentioned first log storage device and the above-mentioned second log storage device. The above-mentioned DB updating can be started after the above-mentioned DB-pair state has been converted to the above-mentioned pair-split state. The pair-split state of the above-mentioned DB-pair state can be cancelled subsequent to completion of the above-mentioned DB updating. The above-mentioned logless-end log can be written to the above-mentioned first log storage device subsequent to completion of updating of the above-mentioned difference to the above-mentioned second DB storage device in accordance with the cancellation of the above-mentioned pair-split state.

In a fifth embodiment, when the above-mentioned DB-pair state constitutes the above-mentioned pair-split state, the above-mentioned logless-start log can be written to the above-mentioned first log storage device. The above-mentioned unmirrored data can be written from the above-mentioned memory to the above-mentioned first DB storage device. A log written to the above-mentioned second log storage device prior to the logless-start log can be used prior to the start of the above-mentioned DB updating, the above-mentioned second DB storage device database can be updated, and a backup of this updated second DB storage device can be acquired by the above-mentioned second storage subsystem. The pair-split state of the above-mentioned DB-pair state can be canceled subsequent to completion of the above-mentioned DB updating. The above-mentioned logless-end log can be written to the above-mentioned first log storage device subsequent to completion of updating of the above-mentioned difference to the above-mentioned second DB storage device in accordance with the cancellation of the above-mentioned pair-split state.

In a sixth embodiment, subsequent to the above-mentioned unmirrored data being written from the above-mentioned memory to the above-mentioned first DB storage device, a backup of the above-mentioned first DB storage device, in which the above-mentioned unmirrored data is mirrored, can be acquired by the above-mentioned first storage subsystem prior to the commencement of the above-mentioned DB updating.

In a seventh embodiment, when the above-mentioned DB-pair state constitutes the above-mentioned pair-split state, the above-mentioned logless-start log can be written to the above-mentioned first log storage device. The above-mentioned unmirrored data can be written from the above-mentioned memory to the above-mentioned first DB storage device. The pair-split state of the above-mentioned DB-pair state can be canceled. The above-mentioned DB updating can be commenced subsequent to completion of updating of the above-mentioned difference to the above-mentioned second DB storage device in accordance with the cancellation of the above-mentioned pair-split state. Subsequent to completion of the above-mentioned DB updating, the above-mentioned DB-pair state can once again be converted to the above-mentioned pair-split state, and thereafter, the above-mentioned logless-end log,can be written to the above-mentioned first log storage device.

In an eighth embodiment, after the above-mentioned DB-pair state is once again converted to the above-mentioned pair-split state subsequent to the completion of the above-mentioned DB updating, the above-mentioned second storage subsystem can request that the above-mentioned first storage subsystem cancel the logless mode, and the above-mentioned first storage subsystem can write the above-mentioned logless-end log to the above-mentioned first log storage device in accordance with this request.

In a ninth embodiment, when the above-mentioned first DB storage device fails, if the above-mentioned logless-start log is stored in either the above-mentioned first log storage device or said second log storage device, but the above-mentioned logless-end log is not stored in either the above-mentioned first log storage device or the above-mentioned second log storage device, the database, which was stored in the above-mentioned first DB storage device, is restored as close as possible to the point in time of the above-mentioned failure by executing recovery processing corresponding to the above-mentioned logless mode.

In either a database management system or method according to the present invention, when, as a log control mode, which is a mode related to controlling a log of a database, are provided a logless mode, which is a mode in which a log comprising at least the update history of the above-mentioned database is not created even if this database is updated during a transaction, and a mode, which differs from the above-mentioned logless mode, and a transaction is executed in the above-mentioned logless mode, a logless-start log, which is a log denoting the start of the above-mentioned logless mode, can be created at the start of this transaction, and issued to the above-mentioned first log storage device. Further, DB updating for respectively issuing a plurality of data to the database of the above-mentioned first DB storage device can be executed. Also, a pair command for canceling a pair-split state between the above-mentioned first DB storage device and the above-mentioned second DB storage device either prior to the start or subsequent to the completion of the above-mentioned DB updating can be issued to the above-mentioned first storage subsystem while a transaction-in-progress is being executed. Further, a logless-end log, which is a log denoting the termination of said logless mode, can be created, and this logless-end log can be issued to the above-mentioned first log storage device when the difference between the above-mentioned first DB storage device and the above-mentioned second DB storage device has been done away with subsequent to the completion of the above-mentioned DB updating.

A computer according to the present invention can comprise a logless-start log issuing unit, a DB operation unit, a pair command unit, and a logless-end log issuing unit. The logless-start log issuing unit, when, as a log control mode, which is a mode related to controlling a log of a database, are provided a logless mode, which is a mode in which a log comprising at the least the update history of the above-mentioned database is not created even if this database is updated during a transaction, and a mode, which differs from the above-mentioned logless mode, and a transaction is executed in the above-mentioned logless mode, can create at the start of this transaction a logless-start log, which is a log denoting the start of the above-mentioned logless mode, and can issue this log to the above-mentioned first log storage device. The DB operation unit can execute DB updating for respectively issuing a plurality of data to the database of the above-mentioned first DB storage device. The pair command unit can issue to the above-mentioned first storage subsystem a pair command for canceling the pair-split state between the above-mentioned first DB storage device and the above-mentioned second DB storage device either prior to commencement or subsequent to completion of the above-mentioned DB updating while a transaction-in-progress is being executed. The logless-end log issuing unit can create a logless-end log, which is a log denoting the termination of the above-mentioned logless mode, and issue this logless-end log to the above-mentioned first log storage device when the difference between the above-mentioned first DB storage device and the second DB storage device is done away with subsequent to the completion of the above-mentioned DB updating.

A storage subsystem according to the present invention comprises the above-mentioned first DB storage device and first log storage device, and a controller. An external storage subsystem comprises a second DB storage device capable of being paired with the above-mentioned first DB storage device, and a second log storage device capable of being paired with the above-mentioned first log storage device. In this case, the above-mentioned controller is constituted such that, when a DB-pair state, which is the pair state of the above-mentioned first DB storage device and the above-mentioned second DB storage device, is a pair-split state, and a difference occurs between the above-mentioned first DB storage device and the above-mentioned second DB storage device, this difference is managed, and when this pair-split state is cancelled, the above-mentioned first storage controller causes this difference to be updated in the above-mentioned second DB storage device by sending the above-mentioned managed difference to the above-mentioned second storage subsystem, thereby making it possible to do away with the difference between the above-mentioned first DB storage device and the above-mentioned second DB storage device. Further, a log-pair state, which is a pair state between the above-mentioned first log storage device and the above-mentioned second log storage device, constitutes a synchronous/asynchronous pair state in which data written to the above-mentioned first log storage device is transferred to the above-mentioned second log storage device either synchronously or asynchronously with a write to a prescribed region of the above-mentioned first storage subsystem prior to the commencement of a transaction, and by so doing, when data is written to the above-mentioned first log storage device, the above-mentioned controller is constituted so as to send this data to the above-mentioned external storage subsystem so that it will be written to the above-mentioned second log storage device. The above-mentioned controller, when, as a log control mode, which is a mode related to controlling a log of a database, are provided a logless mode, which is a mode in which a log comprising at the least the update history of the above-mentioned database is not created even if this database is updated during a transaction, and a mode, which differs from the above-mentioned logless mode, and a transaction is executed in the above-mentioned logless mode, can create at the start of this transaction a logless-start log, which is a log denoting the start of the above-mentioned logless mode, and can write this logless-start log to the above-mentioned first log storage device. The above-mentioned controller can also execute DB updating for respectively issuing a plurality of data to the database of the above-mentioned first DB storage device. Further, the above-mentioned controller can also cancel a pair-split state between the above-mentioned first DB storage device and the above-mentioned second DB storage device either prior to commencement or subsequent to completion of the above-mentioned DB updating while a transaction-in-progress is being executed. Further, the above-mentioned controller can also create a logless-end log, which is a log denoting the termination of the above-mentioned logless mode, and can write this logless-end log to the above-mentioned first log storage device when the difference between the above-mentioned first DB storage device and the second DB storage device is done away with subsequent to the completion of the above-mentioned DB updating.

The processing carried out by the above-mentioned storage control method, database management system or method, computer, or storage subsystem can be executed by each prescribed element. The respective elements can be referred to as respective means. Each element and each means can also be realized by hardware (for example, a circuit), a computer program, or a combination of these (for example, one or a plurality of CPUs, which read in and execute a computer program). Each computer program can be read in from a storage resource (for example, a memory) disposed in a computer machine. A computer program can also be installed in this storage resource via a CD-ROM, DVD (Digital Versatile Disk) or other such recording medium, and can also be downloaded to this storage resource via a communications network, such as the Internet or a LAN. The above-mentioned database management system can be mounted in a storage subsystem, or it can be mounted in a host computer, which controls a storage subsystem.

According to the present invention, it is possible for a database to be recovered even when a log comprising a DB update history is not created.

BRIEF DESCRIPTION OF THE DRAWINGS

FIG. 3A shows an example of the configuration of DB-disk mapping table 213A, and FIG. 3B shows an example of the configuration of a primary remote copying management table 319A;

FIG. 12A shows an example of selecting the recovery process to be carried out when a failure occurs, and FIG. 12B shows an example of a recovery process corresponding to a logless mode.

DESCRIPTION OF THE PREFERRED EMBODIMENT

Figure 1:
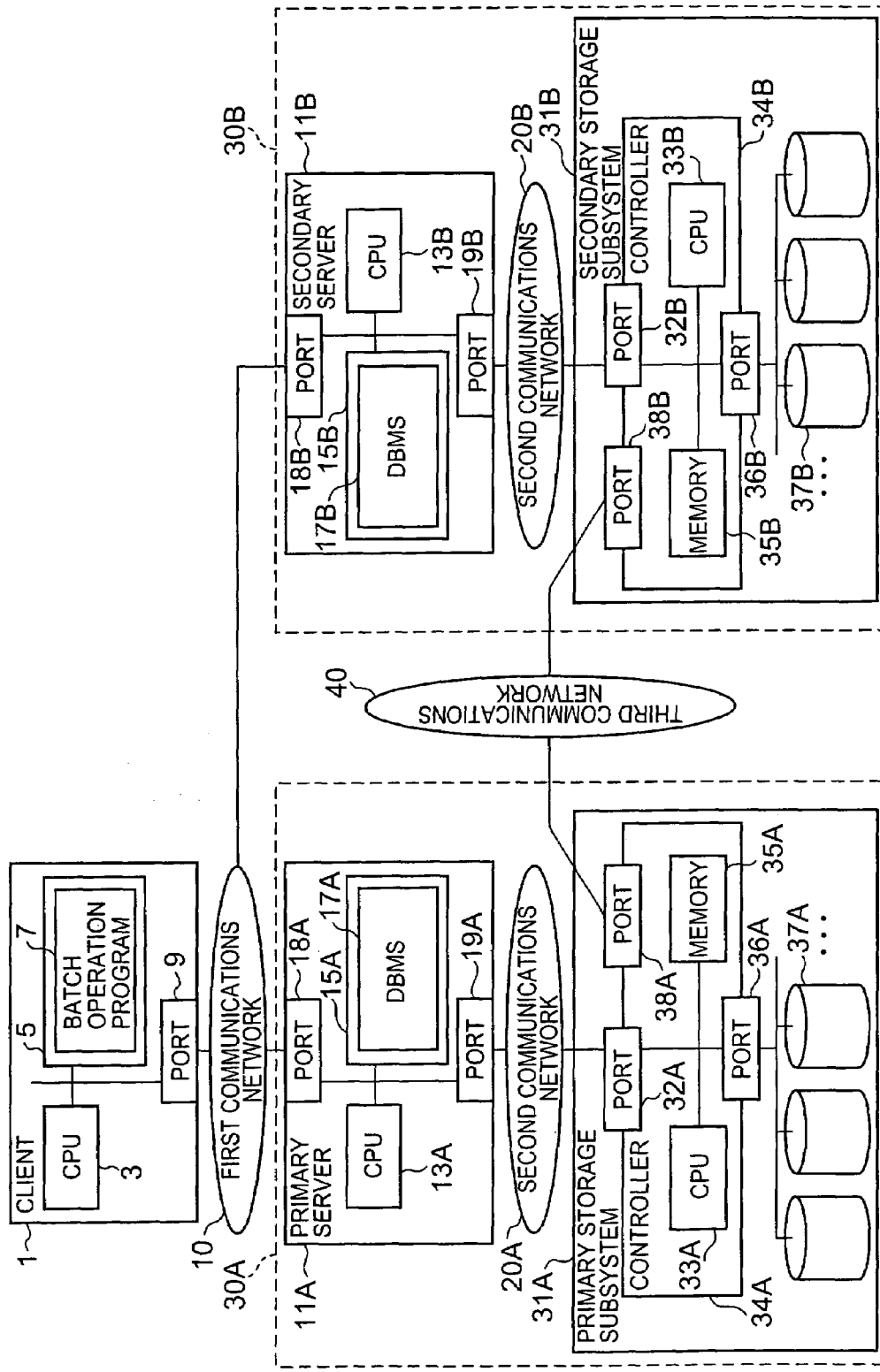
FIG. 1 shows an example of the overall configuration of a system of a first embodiment of the present invention.

FIG. 1 shows an example of the overall configuration of a system of a first embodiment of the present invention.

For example, there is a primary site 30A, and a secondary site 30B, which is geographically separated from the primary site 30A. A client 1 can access, via a first communications network 10, either primary server 11A of the primary site 30A, which will be explained hereinbelow, or a secondary server 11B of the secondary site 30B, which will be explained hereinbelow. The client 1 is a kind of computer, and, for example, can comprise a CPU 3, and a port 9, which is capable of connecting to a storage resource 5 and a first communications network 10. A storage resource 5, for example, is a memory and/or an auxiliary storage device (for example, a hard disk drive, hereinafter HDD). A storage resource 5 is capable of storing data and a plurality of types of computer programs, for example, a computer program 7 for executing a batch operation (hereinafter, a batch operation program). The CPU 3 can read and execute a batch operation program. Hereinbelow, there will be instances when the subject of a process, which is performed in accordance with a CPU reading and executing a computer program, will be referred to not as a CPU, but rather as a computer program for the sake of making the explanation easier to understand.

A primary site 30A and a secondary site 30B can have the same constitution. Hereinbelow, a number-symbol set will be assigned to the same elements inside the respective sites, with A being assigned as the symbol to elements inside the primary site 30A, and B being assigned as the symbol to elements inside the secondary site 30B. The primary site 30A and secondary site 30B will be explained hereinbelow by giving the primary site 30A as a typical example.

The primary site 30A comprises a primary server 11A and a primary storage subsystem 31A. The primary server 11A can access the primary storage subsystem 31A via a second communications network 20A.

The primary server 11A is a kind of host computer, and, for example, can comprise a CPU 13A, a storage resource 15A, a port 18A capable of connecting to a first communications network 10, and a port 19A capable of connecting to a second communications network 20A. The storage resource 15A, for example, is a memory and/or an auxiliary storage device (for example, an HDD). The storage resource 15A can store data, and a plurality of types of computer programs, for example, a database management system (hereinafter, DBMS) 17A. The CPU 13A can read in and execute the DBMS 17A.

The primary storage subsystem 31A comprises a plurality of disk devices (for example, these can be HDD, or other kinds of physical storage devices) 37A; and a controller 34A for controlling access to a disk device. The controller 34A, for example, comprises a port 32A capable of connecting to the second communications network 20A; a port 38A capable of connecting to a third communications network 40; a port 36A capable of connecting to a disk device 37A; a CPU 33A; and a memory 35A. The controller 34A can access a secondary storage subsystem 31B of the secondary site 30B from the port 38A by way of the third communications network 40. The secondary storage subsystem 31B can communicate with a secondary server 11B via a second communications network 20B.

In the above configuration, at least two of the first communications network 10, second communications networks 20A, 20B, and third communications network 40 can be a single network. Further, at least one of the client 1, servers 11A, 11B, and storage subsystems 31A and 31B can be virtually generated in a single device (that is, a so-called virtual computer). Also, the above configuration of the controllers 34A, 34B is an example, and another configuration can be adopted. For example, instead of the above-mentioned configuration, at least one of controllers 34A and 34B can comprise a plurality of first control units (for example, control circuit boards) for controlling communications with an external device (for example, a server, or a storage subsystem other than itself); a plurality of second control units (for example, control circuit boards) for controlling communications with a disk device; a cache memory capable of storing data to be exchanged between an external device and a disk device; a control memory capable of storing data for controlling a storage subsystem (the cache memory and control memory do not have to be separate memories); and a connector (for example, a switch, such as a crossbar switch) for connecting the respective first control units, respective second control units, cache memory, and control memory. In this case, either one of a first control unit or a second control unit, or both in cooperation, can perform the processing of the controllers 34A and 34B. Further, the primary server 11A and the primary storage subsystem 31A can be integrated together (more specifically, for example, the functionality of the primary server 11A (for example, the DBMS 17A) can be provided in the primary storage subsystem 31A). Similarly, the secondary server 11B and the secondary storage subsystem 31B can also be integrated together.

Figure 2:
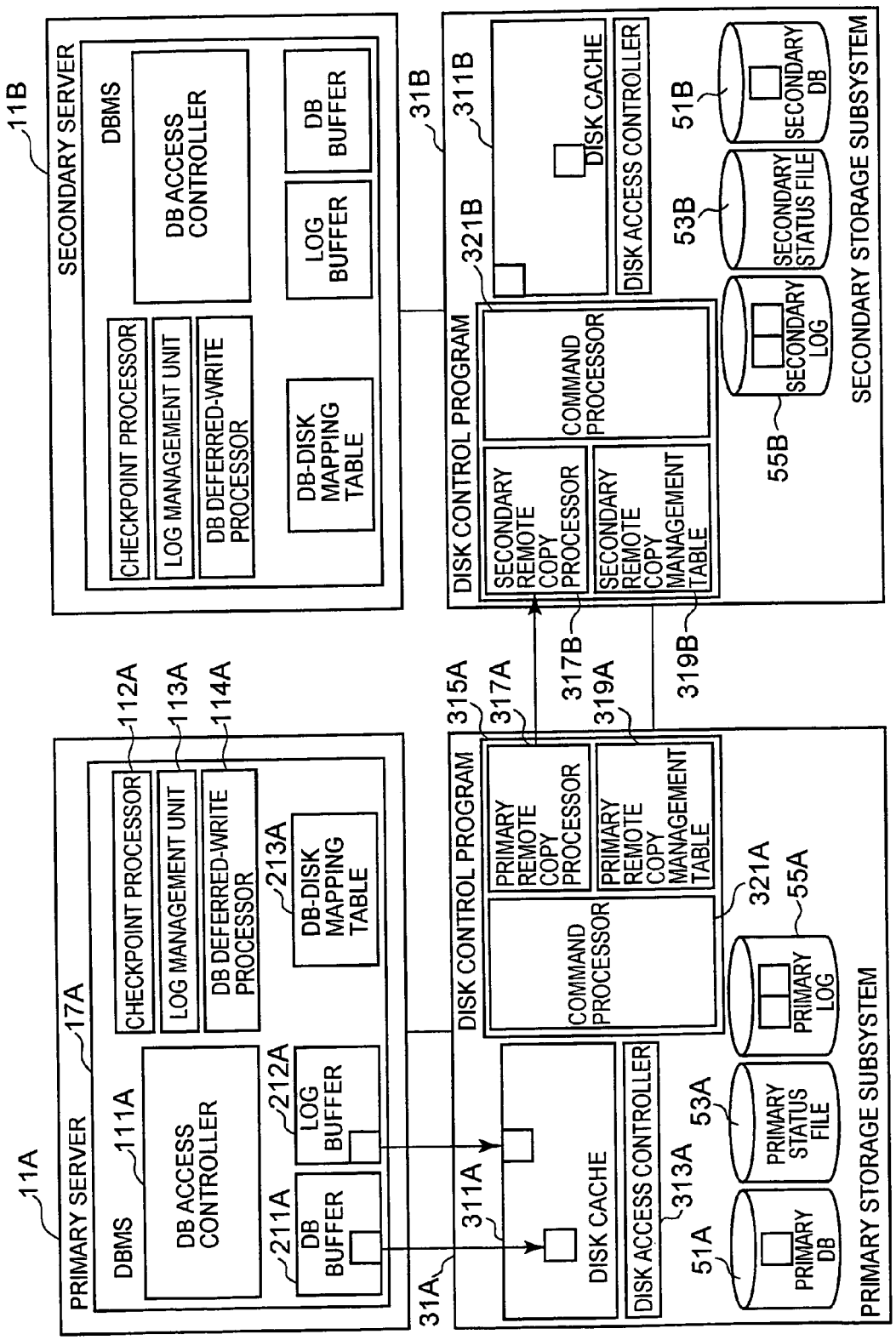
FIG. 2 shows an example of the configuration of a storage system related to this embodiment.

FIG. 2 shows an example of the configuration of a storage system related to this embodiment. As described hereinabove, since the primary site 30A and the secondary site 30B can substantially be the same constitution, the primary site 30A will primarily be explained hereinbelow.

The DBMS 17A has a DB access controller 111, a checkpoint processor 112A, a log management unit 113, and a DB deferred-write processor 114. A DB buffer 211A and a log buffer 212A are provided in the storage resource 15A of the primary server 11A (for example, the memory). Also, a DB-disk mapping table 213A is stored in the storage resource 15A.

The DB access controller 111A controls the storing of data in a primary DB VOL 51A via the DB buffer 211A (that is, DB updating), and the storing of a log in a primary log VOL 55A via the log buffer 212A. The checkpoint processor 112A sends, to the primary storage subsystem 31A, a write request for status information, which denotes all the updated DB blocks in the DB buffer 211A, and the latest log record of the primary log VOL 55A at that point in time, and its location, when it becomes necessary to mirror the data stored in the DB buffer 211A in the primary storage subsystem 31A.

Since a transaction is not always complete at checkpoint time, there are cases in which this status information denotes the location of the oldest log record related to an incomplete transaction in addition to the location of the latest log record. There are also cases in which the updating of status information on a disk is deferred. In either case, this status information can be utilized as information denoting the location of a log for commencing a reference when the DBMS 17A is restarted.

The log management unit 113 sends a write request to the primary storage subsystem 31A for a log block, which is log information showing the contents of DB processing carried out relative to the DB buffer 211A. The DB deferred-write processor 114 sends a write request to the primary storage subsystem 31A for data in the DB buffer 211A.

As computer programs, which are read in and executed by the CPU 33A of the controller 34A, there are a disk control program 315A, and a disk access controller 313A. The disk control program 315A has a command processor 321A and a primary remote copying processor 317A. The disk control program 315A can acquire a primary remote copying management table 319A from a memory 35A. Further, a plurality of logical volumes (hereinafter, VOL) can be set in the primary storage subsystem 31A using the physical storage resources of a plurality of disk devices 37A. The plurality of VOLs comprises, for example, a VOL for storing a DB (hereinafter, primary DB VOL) 51A; a VOL for storing status information (hereinafter, primary status VOL) 53A; and a VOL for storing a log (hereinafter, primary log VOL) 55A. In this embodiment, a VOL, which constitutes the copy origin of a VOL pair is treated as the primary VOL, and a VOL, which constitutes the copy destination, is treated as the secondary VOL. If the VOL attributes (primary and secondary) are reversed, the copy origin and copy destination can also be reversed, so that copying can also be performed from a secondary VOL to a primary VOL. Further, in copying data between VOLs, data can be read out from a primary VOL and copied to a secondary VOL, and data, which is data that is written to a primary VOL and left behind in disk cache 311A, can be copied to a secondary VOL.

The disk control program 315A can control the overall operation of the primary storage subsystem. The command processor 321A receives a write request for a DB block (a data block included in a DB), the above-mentioned status information, or a log block (a data block, which constitutes a log) from the primary server 11A, and, in accordance with the content of this received write request, can perform updating of the primary DB VOL 51A, primary status VOL 53A, and primary log VOL 55A, or the disk cache 311A (e.g.: a part of the memory 35A) in which these contents are stored.

The primary remote copying processor 317A can reference the primary remote copying management table 319A, and perform either synchronous or asynchronous remote copying in accordance with the configuration information thereof. In this embodiment, when the received write request is a log block write request, synchronous remote copying of a log block can be performed to the secondary storage subsystem 31B. Conversely, when the received write request is a DB block (or status information) write request, this write request can be temporarily stored in the memory 35A, and asynchronous remote copying can be performed to the secondary storage subsystem 31B.

The disk access controller 23 can control access to the respective disk devices 37A.

In the primary storage subsystem 31A, access to the respective VOLs on a disk device 37A is performed by way of the disk control program 315A, which runs upon receiving a command from the primary server 11A, disk cache 311A, and the disk access controller 313A, and disk access is always carried out via disk cache 311A. Disk cache 311A can be constituted as a non-volatile memory. In this case, data is guaranteed at the point in time at which this data is stored in the disk cache 311A.

The DB access controller 111A can acquire a DB block from the primary storage subsystem 31A in accordance with a read command, and store the DB block in the DB buffer 211A when access to the primary DB VOL 51A is requested by a transaction, and after database processing is performed for the DB block in the DB buffer 211A, it can store the log information denoting the contents of this processing in a log block of the log buffer 212A.

The checkpoint processor 112A, when the need arises to mirror the contents of the DB buffer 211A of the primary server 11A to a disk device inside the primary storage subsystem 31A, such as when the log record indicating that a record in the DB buffer 211A has been updated reaches a prescribed number, can generate and send to the primary storage subsystem 31A, as a status information write request, which shows the entire DB block updated in the DB buffer 211A and the location of the latest log record at that time, a write command for performing a DB block or status information write.

The log management unit 113A, when a prescribed condition is reached at transaction commitment, such as the passage of a prescribed time period after a log information record has commenced, or the exhaustion of free space in the log buffer 212A, can generate and send to the primary storage subsystem 31A, as a write request to the primary log VOL 55A of a log block stored in the log buffer 212A, a write command for performing a log block write.

The DB deferred-write processor 114A, when a prescribed condition is reached, such as the passage of a prescribed time period after database processing has commenced, or the exhaustion of free space in the DB buffer 211A, can generate and send to the primary storage subsystem 31A, as a write request to the primary DB VOL 51A of a DB block in the DB buffer 211A, a write command for performing a DB block write.

In this embodiment, as described hereinabove, a synchronous remote copy is performed for a log block. More specifically, for example, when a log block write request is sent from the primary server 11A, the primary storage subsystem 31A writes the log block sent together with this write request to disk cache 311A, sends this log block write request (hereinafter, remote copy request) to the secondary storage subsystem 31B, and waits for this to be completed. The secondary storage subsystem 31B, after writing the log block sent together with this remote copy request to disk cache 311B, generates and sends to the primary storage subsystem 31A a remote copy-complete notification indicating that this write is complete. The primary storage subsystem 31A, upon receiving the remote copy-complete notification from the secondary storage subsystem 31B, generates and writes to the primary server 11A a completion notification indicating that the log block write has been completed.

Conversely, in this embodiment, as described hereinabove, an asynchronous remote copy is performed for a DB block (or status information). More specifically, for example, when a DB block write request is sent from the primary server 11A, the primary storage subsystem 31A writes the DB block sent together with this write request to disk cache 311A, and generates and sends to the primary server 11A a completion notification indicating that this DB block write has been completed. Thereafter, the primary storage subsystem 31A sends a remote copy request for the DB block in disk cache 311A to the secondary storage subsystem 31B, and waits for this to be completed. The secondary storage subsystem 31B, after receiving the DB block sent together with this remote copy request, generates and sends to the primary storage subsystem 31A a remote copy-complete notification indicating that this request has been completed.

Now then, the above-mentioned DB-disk mapping table 213A and primary remote copying management table 319A will be explained hereinbelow.

FIG. 3A shows an example of the configuration of a DB-disk mapping table 213A.

For example, a database area ID, which is information for identifying a DB region, a file ID, which indicates a file number when a DB region identified by this database area ID constitutes a plurality of files, and a classification, which indicates that the data inside this DB region is either DB data (DB), log data (log), or status information (status), are recorded in the DB-disk mapping table 213A. Further, for example, an ID (primary controller ID) for identifying a controller 34A for accessing this DB region, a VOL ID (primary physical device ID), which possesses this DB region, an ID (secondary controller ID) of a controller 34B, which corresponds to this DB region, and a secondary VOL ID (secondary physical device ID) capable of being paired with a VOL possessing this DB region, can also be recorded in the DB-disk mapping table 213A.

FIG. 3B shows an example of the configuration of a primary remote copying management table 319A.

For example, a copy mode, which indicates whether write processing will be performed synchronously or asynchronously for each VOL, the IDs of a primary and a secondary controller for which write processing is performed in this copy mode, and a primary VOL ID (LUN) and secondary VOL ID, which constitute a VOL pair, are recorded in the primary remote copying management table 319A. In addition, a pair state can also be recorded for each VOL pair. As a pair state, for example, there is a synchronous/asynchronous pair state (a state, wherein it is possible to make a data group inside a primary VOL the same as a data group inside a secondary VOL by either synchronously or asynchronously copying data written to the primary VOL to a secondary VOL), and a pair-split state (a state, wherein a difference between a primary VOL and a secondary VOL is managed by the primary storage subsystem 31A without updating the data in a secondary VOL even if the primary VOL is updated).

In accordance with the information in the DB-disk mapping table 213A and primary remote copying management table 319A, it is clear that a log block, a DB block, and status information, respectively, have been written to the secondary storage subsystem 31B either synchronously or asynchronously. For example, from FIG. 3A it is clear that that a log block of database area ID "LOG1" is written to a VOL of primary physical device ID "VOL12-a" by the primary controller ID "CTL#A", and from FIG. 3B it is clear that because the copy mode of a VOL of primary VOL ID "VOL12-A" in primary controller ID "CTL#A1" is "synchronous", the log block of database area ID "LOG1" is written to the secondary storage subsystem 31B via synchronous remote copying.

In this embodiment, it is possible to adopt a plurality of types of copying systems, for example, the two types of copying systems hereinbelow. A plurality of types of copying systems can be selected either automatically or manually.

Figure 4A:
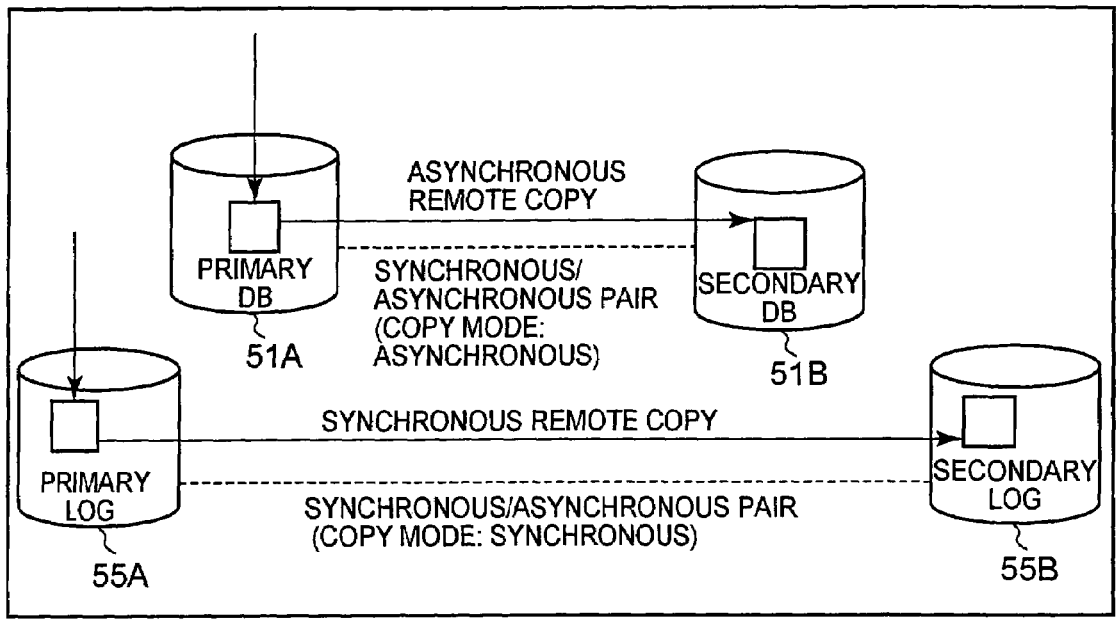
FIG. 4A is a schematic diagram of a first type of copying system.

A first type copying system, as shown in the example in FIG. 4A, is a system, which, when a log block is written to the primary log VOL 55A, writes this log block to the secondary log VOL 55B of the pair partner via synchronous remote copying, and when a DB block is written to the primary DB VOL 51A, writes this DB block to secondary DB VOL 51B of the pair partner via asynchronous remote copying. This copying system, for example, can invoke the technology disclosed in the specification and drawings of Japanese Patent Application 2003-96725.

Figure 4B:
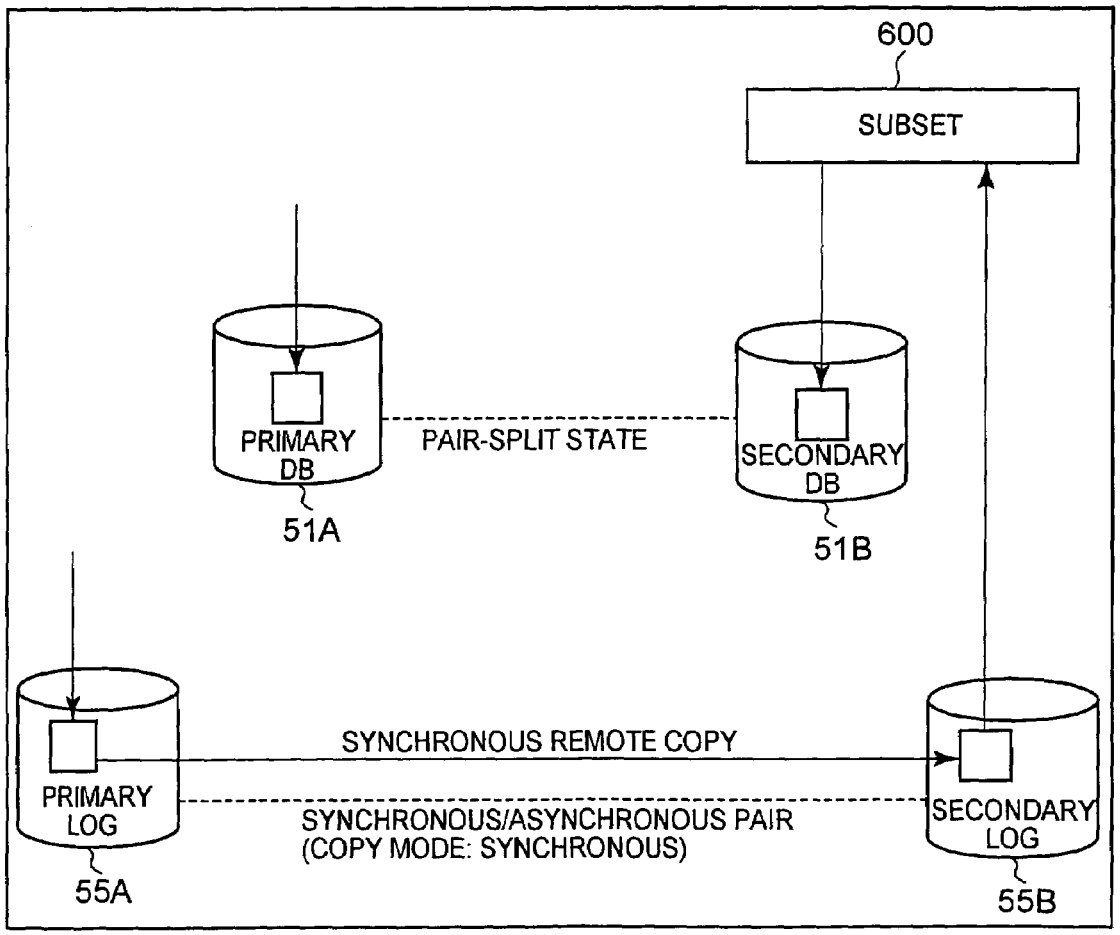
FIG. 4B is a schematic diagram of a second type of copying system.

A second type copying system, as shown in the example in FIG. 4B, is a system, which, when a log block is written to the primary log VOL 55A, writes this log block to the secondary log VOL 55B of the pair partner via synchronous remote copying, but when a DB block is written to the primary DB VOL 51A, as a rule does not write this DB block to secondary DB VOL 51B of the pair partner. In the second type copying system, a subset 600 of the DBMS 17B updates the secondary DB VOL 51B using a log inside the secondary log VOL 55B. By so doing, the DB inside the secondary DB VOL 51B can be made the same as the updated DB inside the primary DB VOL 51A without the DB block written to the primary DB VOL 51A being written to the secondary DB VOL 51B. Furthermore, the subset 600 referred to in this embodiment can invoke the subset disclosed in the specification and drawings of Japanese Patent Application 2003-128163. Further, the subset 600 can also have more functions.

To use a log to update a DB, the update history for the DB (hereinafter, DB update history, for example, what is written in which block) must be recorded in the log, in addition to a status related to a transaction (hereinafter, transaction status, for example, start or committed). That is, the subset 600 can update the secondary DB VOL 51B using a log by virtue of the DBMS 17A of the primary server 11A writing a log comprising both a transaction status and a DB update history to the primary log VOL 55A.

However, if a log comprising both a transaction status and a DB update history is always prepared no matter what the circumstances, processing delays are likely to occur. This can become especially problematic in the case of processing in which the number of DB updates within a certain period of time is larger than a certain number (hereinafter, multiple update processing). Batch processing can be cited as a typical example of multiple update processing.

Accordingly, in this embodiment, a concept called a mode (hereinafter log control mode) related to the control of a log (for example, whether or not to create a log, and what information to record in a log) is provided. There are at least two types of log control modes: a log acquisition mode, and a logless mode. In the log acquisition mode, a transaction status and DB update history are both included in a created log, and a log is created every time a DB is updated. In the logless mode, of the transaction status and DB update log, only the transaction status is included in a created log, and the log itself is not created except at the start and end of a transaction. Furthermore, for example, when a DB is updated during a logless mode transaction, a log lacking a DB update history can be created and written to the primary log VOL 55A.

Figure 5:
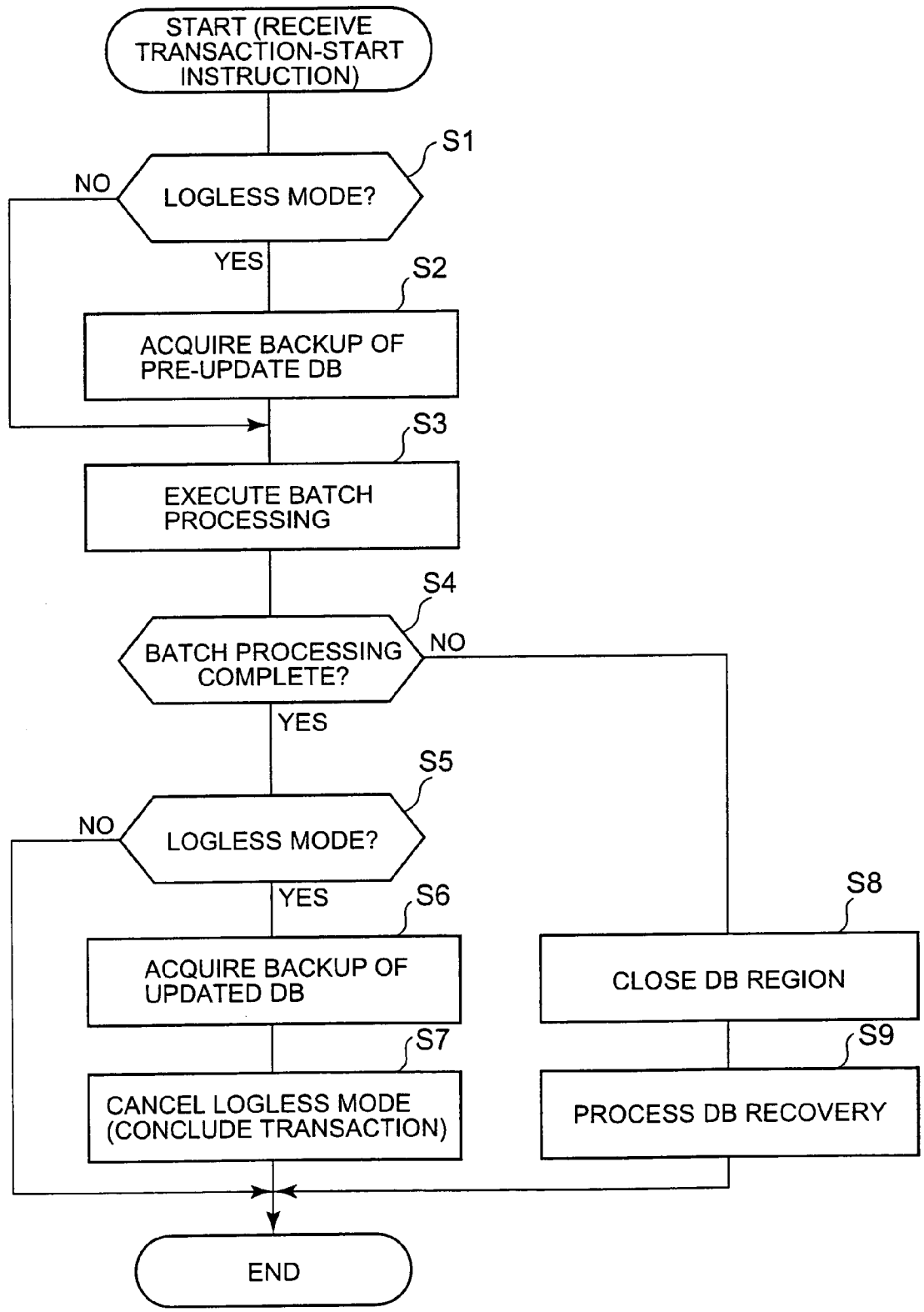
FIG. 5 shows an overview of one example of the flow of processing carried out by a DBMS 17A.

FIG. 5 shows an overview of an example of the flow of processing performed by the DBMS 17A. This processing flow is carried out by operating the DBMS 17A manually, but it can also be performed automatically.

For example, when the DBMS 17A receives a transaction start instruction from the batch operation program 7 of a client computer 1 (more specifically, a batch operation start instruction), a determination is made as to whether the log control mode comprised in the transaction start command is a logless mode or a log acquisition mode (Step S1). If it is the logless mode (S1: YES), the DBMS 17A, subsequent to acquiring a backup of the pre-update DB of the primary DB VOL 51A (S2), performs S3, and if it is the log acquisition mode (S1: NO), it performs S3 without carrying out S2. Furthermore, the acquisition of a backup in S2, for example, refers to the DBMS 17A generating a VOL that is the same as the primary DB VOL 51A inside the primary storage subsystem 31A. More specifically, for example, the DBMS 17A can pair a VOL, which is a VOL inside the primary storage subsystem 31A, and one which conforms to a prescribed condition relative to the primary storage subsystem 31A (for example, a VOL for which the primary DB VOL 51A and storage capacity are the same) with the primary DB VOL 51A, and can copy the pre-update DB inside the primary DB VOL 51A to this VOL. Thereafter, the DBMS 17A can change the pair state between this VOL and the primary DB VOL 51A to a pair-split state by sending a split command.

In S3, the DBMS 17A executes a batch operation. In a batch operation, for example, if the log control mode is the log acquisition mode, the DBMS 17A writes the data from the batch operation program 7 of the client computer 1 to the primary DB VOL 51A, and, in addition, generates a log comprising a DB update history, and writes this log to the primary log VOL 55A. Conversely, if the log control mode is the logless mode, a log is not created for a batch operation.

When a batch operation ends normally (S4: YES), if the log control mode in S is the logless mode (S5: YES), the DBMS 17A acquires a backup of the updated DB inside the primary DB VOL 51A (S6), and writes a log of an instruction for canceling the logless mode to the primary log VOL 55A (S7). This concludes a transaction. When S4 is YES, if the log control mode in S1 is the log acquisition mode (S5: NO), the DBMS 17A ends without performing S6 and S7. In S6, for example, a backup can be acquired via the same method as in S2. Or, for example, an updated DB backup can be acquired in the batch operation of S3 by managing the difference between the backup acquired in S2 and the DB inside the primary DB VOL 51A (for example, what kind of data was ultimately written to which blocks of the DB VOL 51A), and mirroring this difference in the backup acquired in S2 (for example, by overwriting this backup with the updated data managed as a difference).

When a batch operation does not end normally (S4: NO), for example, when it constitutes an abnormal end due to a failure occurring, the DB region inside the primary DB VOL 51A is closed (S8), and recovery processing is performed for the DB in this DB region (S9).

Figure 6:
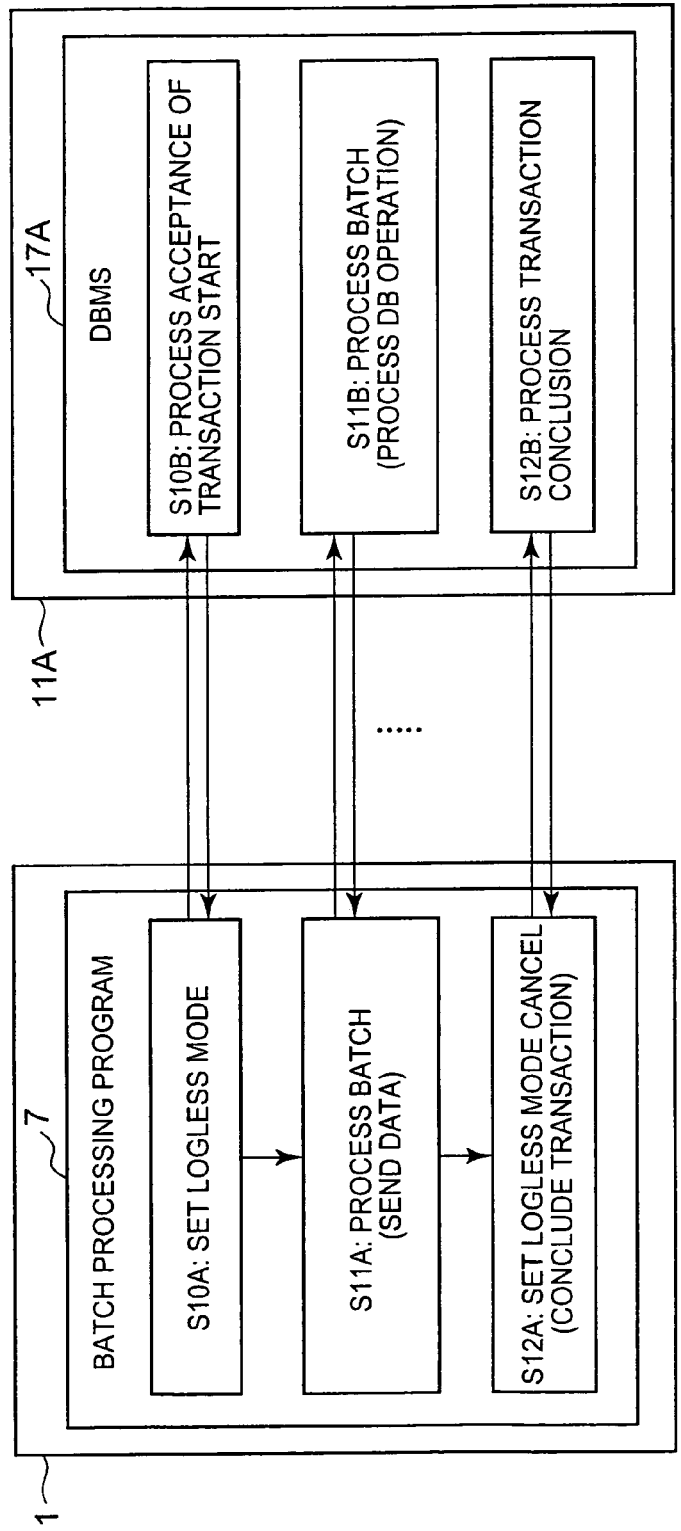
FIG. 6A shows an overview of one example of the flow of communications between a batch operation program of a client computer 1 and the DBMS 17A of a primary server 11A.
FIG. 6B shows an example of the configuration of a log.

FIG. 6A shows an overview of an example of the flow of communication between a batch operation program 7 of a client computer 1 and the DBMS 17A of the primary server 11A. In particular, this FIG. 6A shows an overview of a case in which a logless mode is set.

The batch operation program 7 generates a transaction start instruction, which sets the logless mode, for example, as a kind of environment variable, and sends this transaction start instruction to the primary server 11A (S10A). The DBMS 17A accepts the transaction start instruction, and upon receiving the transaction start instruction, creates a log to that effect, and writes the log in the primary log VOL 55A (S10B). As shown in FIG. 6B, for example, a log sequence number, transaction number, log control mode (log acquisition mode or logless mode) and a transaction status are written in the created log.

The batch operation program 7 carries out batch processing (S11A). More specifically, for example, the batch operation program 7 sends a plurality of write-targeted data, respectively, to the primary server 11A. The DBMS 17A respectively receives the plurality of data, and carries out batch processing (DB operation processing) (S11B). This DB operation processing is done in the logless mode, and a log is not created.

Once logless mode batch processing has ended, the batch operation program 7 concludes the transaction by sending a logless mode-cancel command the primary server 11A (S12A). The DBMS 17A recognizes the logless mode-cancel from this command, and concludes the transaction by creating a log denoting the cancellation of the logless mode, and writing this log to the primary log VOL 55A (S12B).

Figure 7:
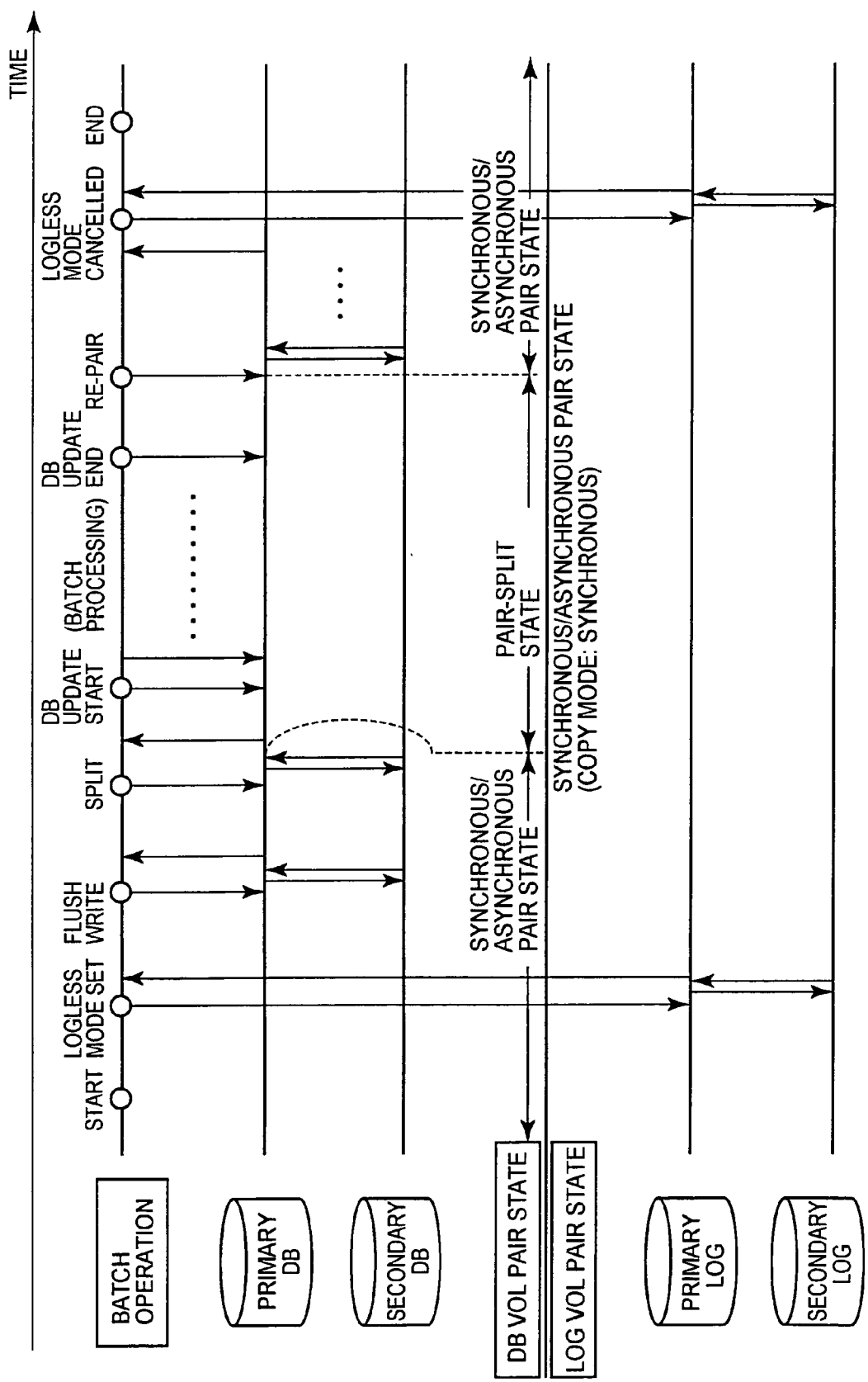
FIG. 7 shows a detailed example of the flow of processing carried out from the beginning to the end of a single transaction.

FIG. 7 shows a detailed example of the flow of processing carried out from the start to the end of a single transaction.

The flow shown in this FIG. 7, for example, is carried out when a pair state between the secondary DB VOL 55A and the secondary DB VOL 55B is a synchronous/asynchronous pair state, or when the first type copying system explained by referring to FIG. 4A has been selected. In this processing flow, the primary DB VOL 51A and the secondary DB VOL 51B are considered to be in a synchronous/asynchronous pair state, but if they are not in this pair state, for example, the DBMS 17A can convert this pair state to a synchronous/asynchronous pair state by sending a prescribed command to the primary storage subsystem 31A in advance.

The DBMS 17A first creates a log denoting the start of the logless mode, and writes this log to the primary log VOL 55A. In this case, because the primary log VOL 55A and secondary log VOL 55B are in a synchronous/asynchronous pair state, and the copying mode is synchronous, a log written to the primary log VOL 55A is written to the secondary log VOL 55B in accordance with a synchronous remote copy.

If, after receiving a write-complete notification for this log from the primary storage subsystem 31A (that is, after the synchronous remote copy is completed), a DB block, which has not been updated in the primary DB VOL 51A, remains in the DB buffer 211, the DBMS 17A compulsorily writes this DB block to the primary DB VOL 51A. This DB block, which has been written out, is written to the secondary DB VOL 51B in accordance with an asynchronous remote copy.

Subsequent to receiving a completion notification with regard to the DB block-write command (flush write) from the primary storage subsystem 31A (that is, after the asynchronous remote copy is completed), the DBMS 17A sends a split command to the primary storage subsystem 31A to convert the pair state between the primary DB VOL 51A and the secondary DB VOL 51B to a pair-split state. If the disk control program 315A of the controller 34A, for example, receives a notification of completion for the asynchronous remote copy from the primary storage subsystem 31A, it sends a split command to the secondary storage subsystem 31B (When this completion notification is not received, a split command can be sent after receiving a command to do so.). When the DB block asynchronous remote copy is complete, a prescribed response to this command is returned from the secondary storage subsystem 31B to the primary storage subsystem 31A, and at this point in time, the pair state of the primary DB VOL 51A and the secondary DB VOL 51B is converted to a pair-split state (for example, an entry to this effect is written in the primary remote copy management table 319A). The primary storage subsystem 31A reports the completion of the split to the DBMS 17A.

Upon receiving this report, the DBMS 17A executes batch processing (DB operation processing). In other words, it commences the updating of a DB inside the primary DB VOL 51A. Since DB operation processing is in the logless mode during this time, the DBMS 17A performs the updating of the DB without creating a log. The controller 34A can manage the difference between the primary DB VOL 51A and the secondary DB VOL 51B. This difference is generated by batch processing, and, for example, entails what kind of information is written to which block of the primary DB VOL 51A.

When DB updating has ended (when batch processing is over), the DBMS 17A sends a command, which cancels the pair-split state between the primary DB VOL 51A and the secondary DB VOL 51B (hereinafter, the re-pairing command) to the primary storage subsystem 31A. This constitutes re-pairing-in-progress. More specifically, the pair state of the primary DB VOL 51A and the secondary DB VOL 51B returns to a synchronous/asynchronous pair state, and, in addition, the difference between the primary DB VOL 51A and the secondary DB VOL 51B is mirrored in the secondary DB VOL 51B. Even more specifically, for example, all the data, which has not been written to the secondary DB VOL 51B, but which ultimately was written to the primary DB VOL 51A, is written to a DB in the secondary DB VOL 51B.

When a notification to the effect that difference mirroring has ended is received from the primary storage subsystem 31A, the DBMS 17A writes a log denoting the cancellation of the logless mode to the primary log VOL 55A. This log is written to the secondary log VOL 55B in accordance with a synchronous remote copy. If a write-complete for this log is received from the primary storage subsystem 31A, the transaction is ended.

Figure 8:
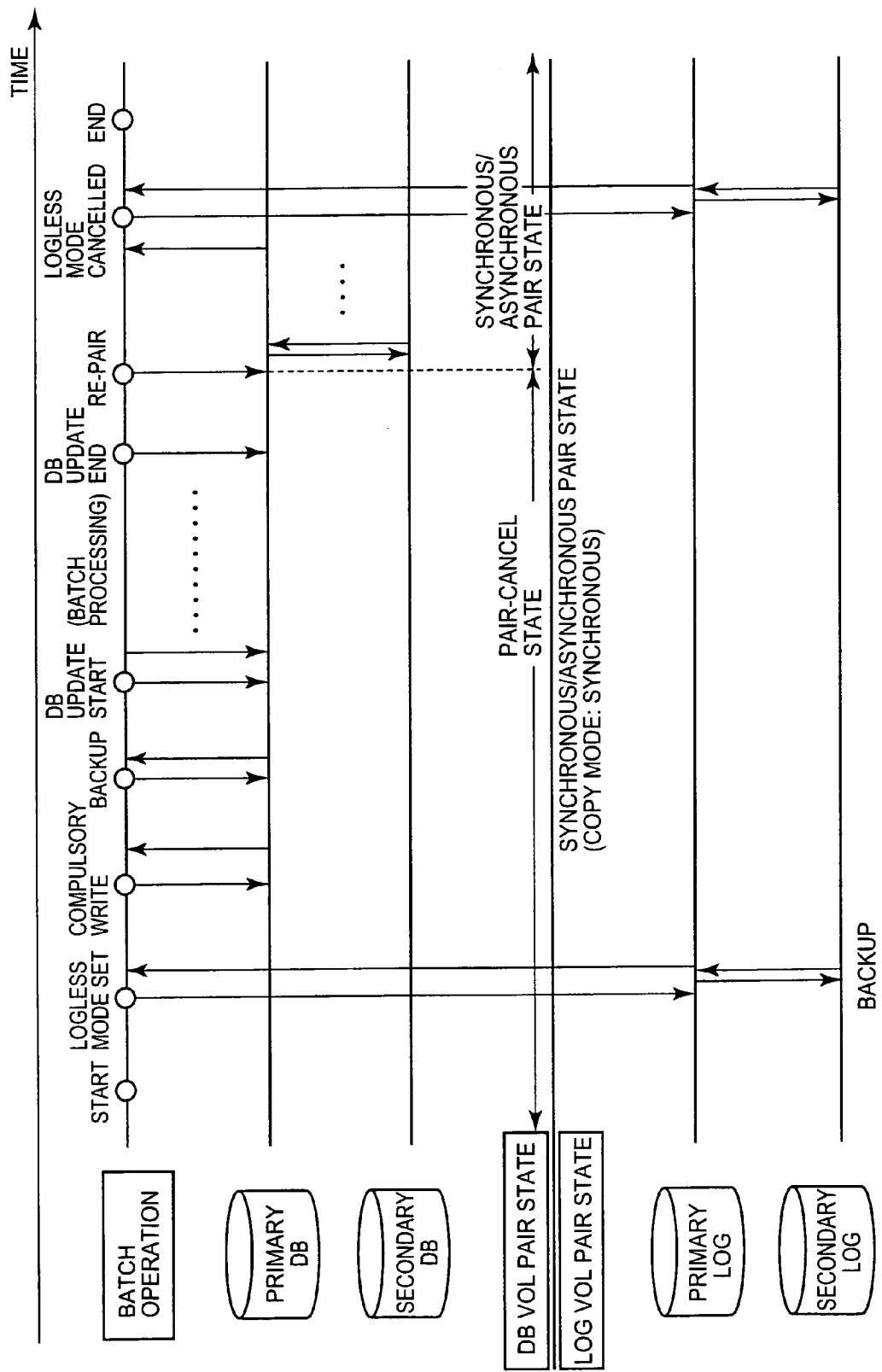
FIG. 8 shows another detailed example of the flow of processing carried out from the beginning to the end of a single transaction.

FIG. 8 shows another detailed example of the flow of processing carried out from the start to the end of a single transaction. The points of difference with FIG. 7 will mainly be explained below, and explanations of the points in common will be abbreviated or simplified.

The flow shown in this FIG. 8, for example, is carried out when the pair state of the primary DB VOL 51A and secondary DB VOL 51B is a pair-split state, or when the second type copying system explained by referring to FIG. 4B is selected.

The DBMS 17A, after receiving a notification of completion regarding a DB block-write command for the primary storage subsystem 31A, (that is, the end of a DB block flush write), acquires a backup of the primary DB VOL 51A. More specifically, for example, as shown in the example in FIG. 9, the DBMS 17A can pair a VOL, which is a VOL inside the primary storage subsystem 31A, and one which conforms to a prescribed condition relative to the primary storage subsystem 31A (for example, a VOL in which the primary DB VOL 51A and storage capacity are the same) 52A with the primary DB VOL 51A as an secondary DB VOL, and can copy the pre-update DB inside the primary DB VOL 51A to this secondary DB VOL 52A. Thereafter, the DBMS 17A can change the pair state between this VOL and the primary DB VOL 51A to a pair-split state by sending a split command. This makes it possible to prevent subsequent updates to the primary DB VOL 51A from being mirrored in the secondary DB VOL 52A.

Thereafter, the DBMS 17A can commence DB updating.

Figure 9:
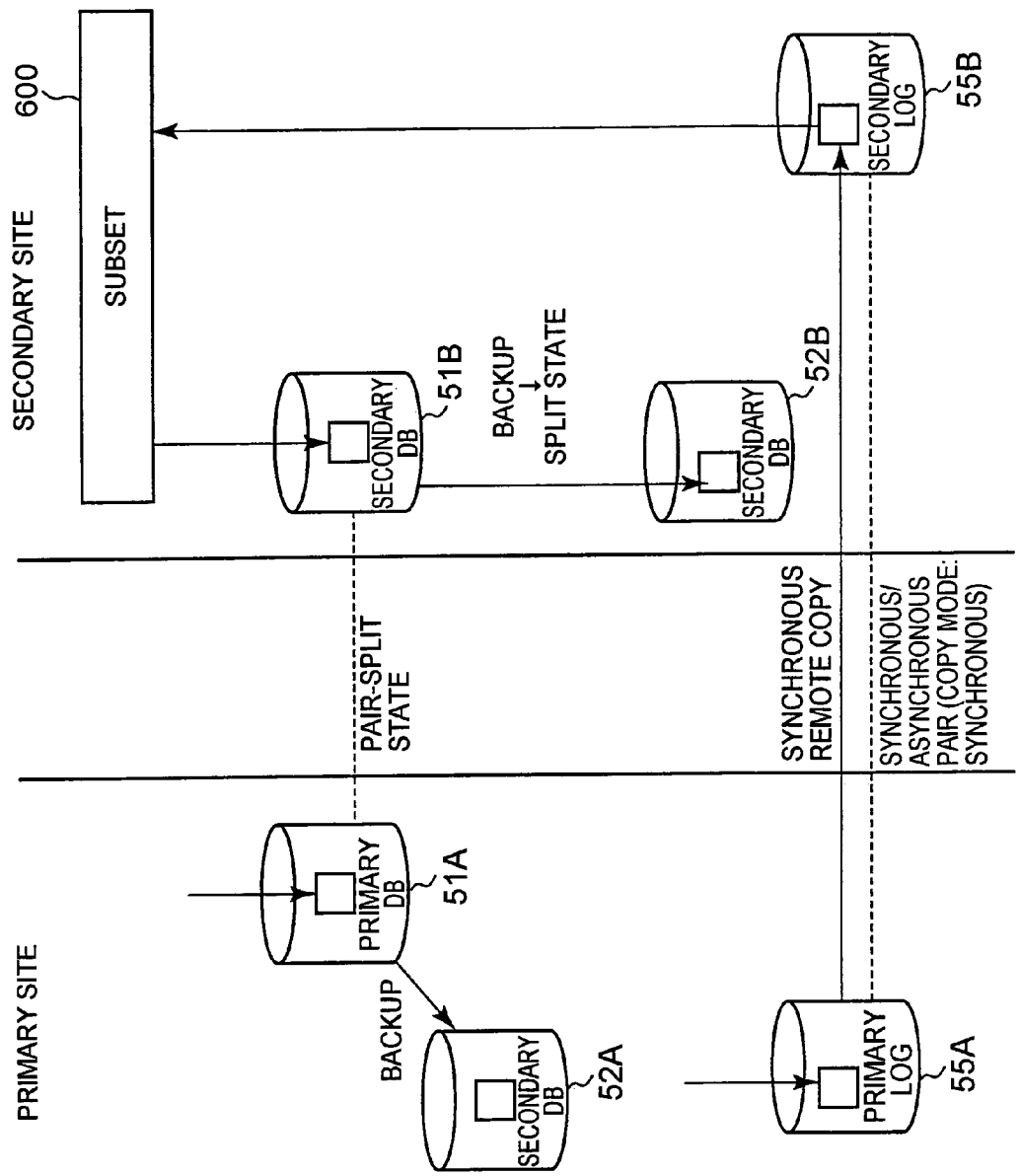
FIG. 9 is a schematic diagram of one example of acquiring a backup in FIG. 8.

Furthermore, in this FIG. 8, since the pair state of the primary DB VOL 51A and the secondary DB VOL 51B constitutes a pair-split state prior to the flush write of the DB block, difference management can be carried out for this write as well. In the secondary site 10B, the subset 600 can update a DB of the secondary DB VOL 51B between the end of DB updating and re-pairing using a log of prior to the log, which denotes the logless mode-set written to the secondary log VOL 55B, and, in addition, can acquire a backup of this updated DB. More specifically, for example, as shown in the example of FIG. 9, the subset 600 can convert a VOL, which is a VOL inside the secondary storage subsystem 31B, and one which conforms to a prescribed condition (for example, a VOL in which the secondary DB VOL 51B and storage capacity are the same) to an secondary DB VOL 52B, can make the secondary DB VOL 51B a secondary DB VOL, and can pair them up (for example, a synchronous/asynchronous pair state), and can copy the updated DB inside the secondary DB VOL 51B to DB VOL 52B. Thereafter, the subset 600 can change the pair state between this VOL 52B and the secondary DB VOL 51B to a pair-split state by sending a split command.

By updating the secondary DB VOL 51B using a log like this, it is possible to make the secondary DB VOL 51B the same as the primary DB VOL 51A of prior to the commencement of a transaction in accordance with the logless mode. Further, by acquiring a backup of this updated secondary DB VOL 51B, for example, even if a failure should occur in the primary DB VOL 51A and secondary DB VOL 51B while a difference is being mirrored in accordance with re-pairing subsequent to the end of DB updating in the primary DB VOL 51A, it is possible to recover the primary DB VOL 51A of prior to the commencement of a transaction by copying the above-mentioned backup of the secondary DB VOL 51B to the primary storage subsystem 31A.

Furthermore, acquisition of a backup of the secondary DB VOL 51B, for example, can be performed automatically when a log denoting logless mode-set is written to the secondary log VOL 55B, and the subset 600 detects this process. Abstractly speaking, the acquisition of the secondary DB VOL 51B backup, for example, is performed when the log denoting logless mode-set is written to the secondary log VOL 55B in accordance with a synchronous remote copy.

Figure 10:
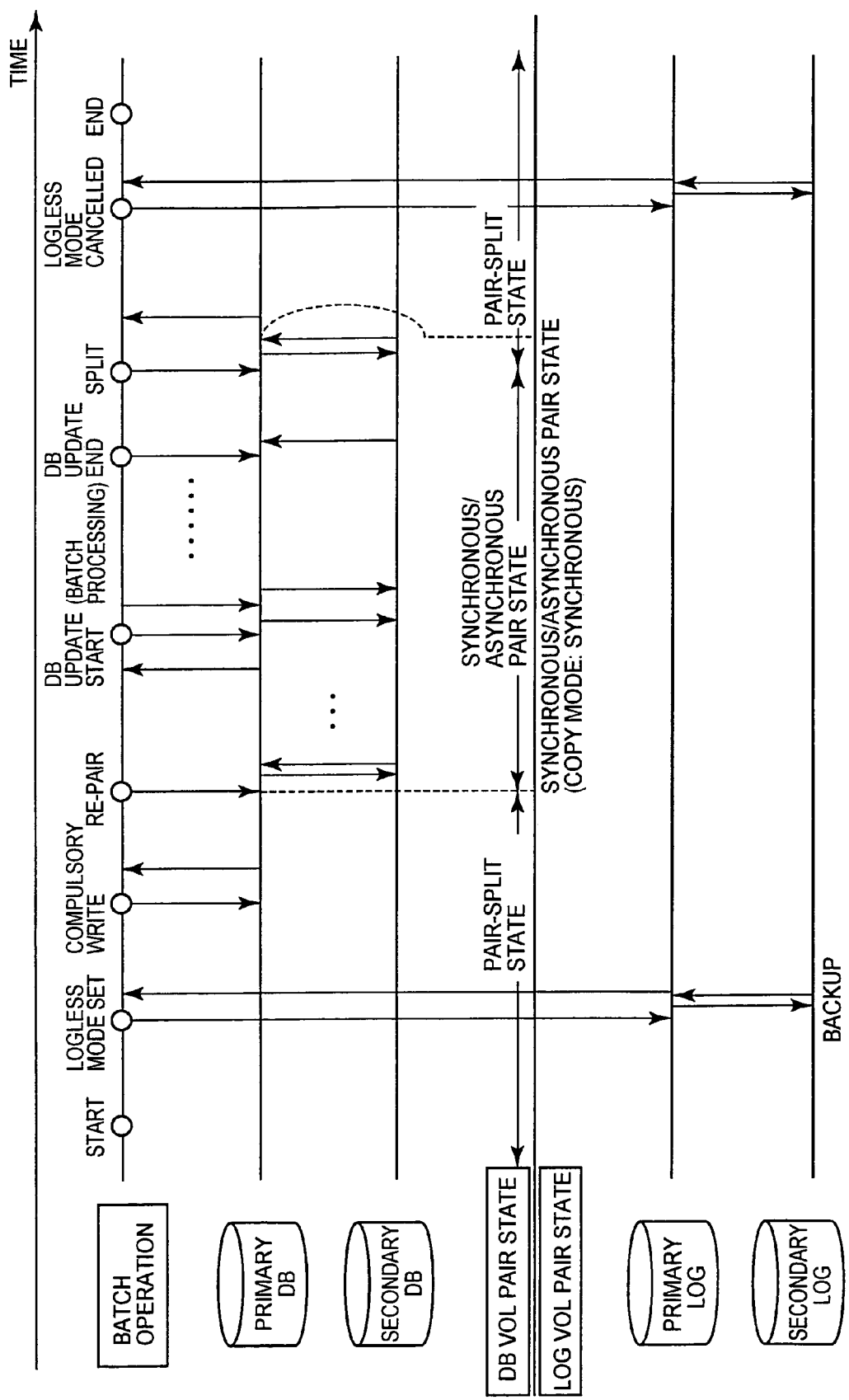
FIG. 10 shows yet another detailed example of the flow of processing carried out from the beginning to the end of a single transaction.

FIG. 10 shows yet another detailed example of the flow of processing carried out between the start and end of a single transaction.

The flow shown in this FIG. 10, for example, is carried out when the pair state of the primary DB VOL 51A and secondary DB VOL 51B is a pair-split state, or when the second type copying system explained by referring to FIG. 4B is selected. In other words, the flow shown in this FIG. 10 is another example of the flow described in FIG. 8. The selection of which processing flow will be used, that of FIG. 8 or that of FIG. 10, can be done automatically or manually. The points of difference with the flow of FIG. 8 will mainly be explained hereinbelow.

In this flow, subsequent to a DB buffer flush write, a backup of the primary DB VOL 51A is not acquired prior to the start of DB updating, and instead of that, the primary DB VOL 51A and secondary DB VOL 51B are re-paired (a re-pair command is issued). In this re-pairing, the primary DB VOL 51A and secondary DB VOL 51B can be converted to a synchronous/asynchronous pair state. When the primary storage subsystem 31A receives a re-pair command from the DBMS 17A, as described hereinabove, the secondary DB VOL 51B becomes a replica of the primary DB VOL 51A by virtue of the difference between the primary DB VOL 51A and secondary DB VOL 51B being mirrored in the secondary DB VOL 51B. Thereafter, DB updating (batch processing) is commenced.

After DB updating has ended, the DBMS 17A sends the primary storage subsystem 31A a split command to convert the pair state of the primary DB VOL 51A and secondary DB VOL 51B to a pair-split state. The pair state of the primary DB VOL 51A and secondary DB VOL 51B becomes a pair-split state when the final data is written to the secondary DB VOL 51B via batch processing. Thereafter, a log denoting logless mode-cancel is written to the primary log VOL 55A, and this results in this log also being written to the secondary log VOL 55B, and the transaction is ended.

Figure 11:
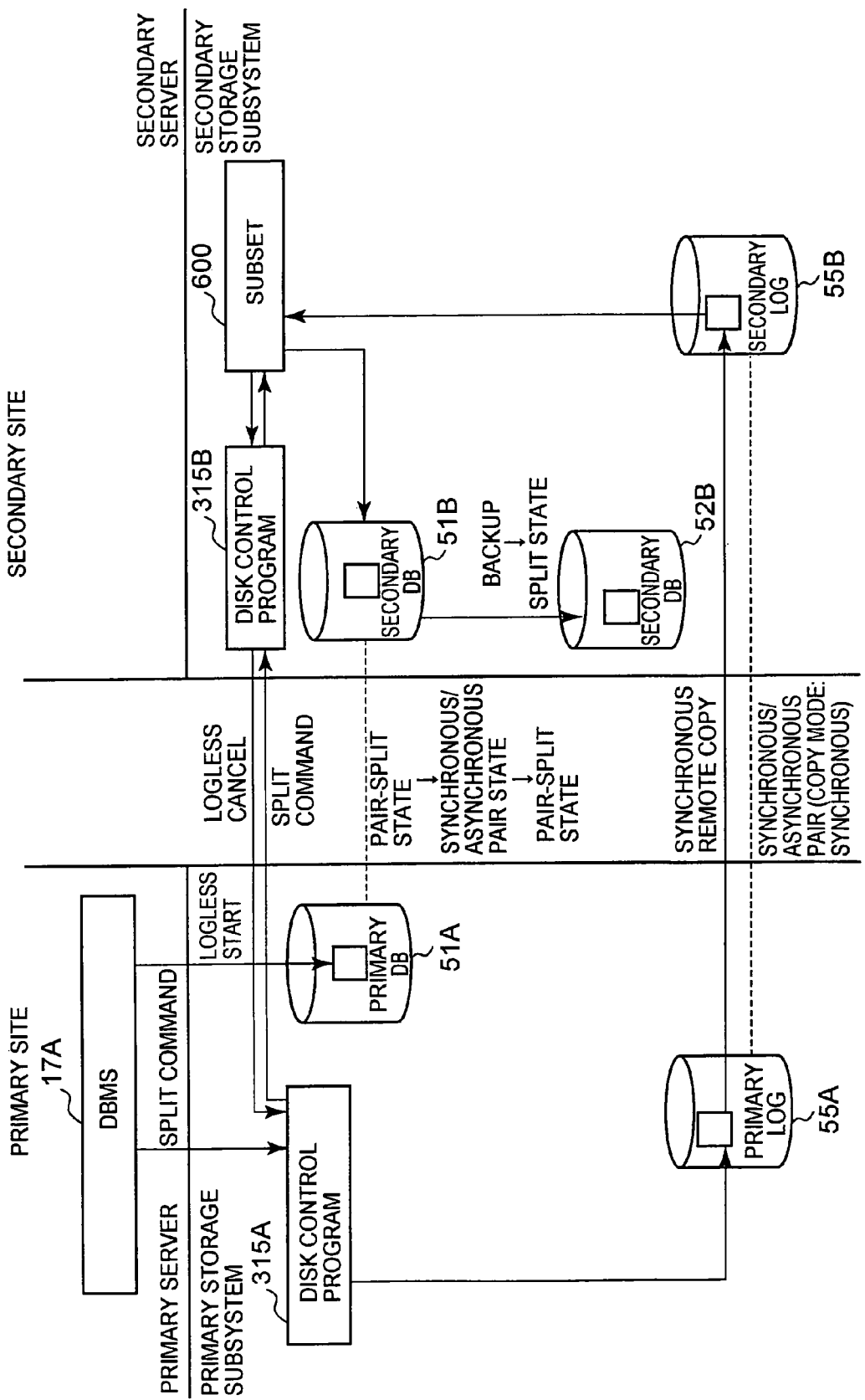
FIG. 11 shows yet a further detailed example of the flow of processing carried out from the beginning to the end of a single transaction.

FIG. 11 shows yet a further detailed example of the flow of processing carried out from the beginning to the end of a single transaction.

The flow shown in FIG. 11 is substantially the same flow as that of FIG. 10. The point of difference is that the flow shown in FIG. 10 is one that is carried out when a subset 600 exists in the secondary server 11B (in the flow of FIG. 8 as well, a subset 600 can also exist in the secondary server 11B), but the flow shown in this FIG. 11 is a flow carried out when a subset 600 exists in the secondary storage subsystem 31B. That is, the subset 600 can exist in either the secondary server 11B or the secondary storage subsystem 31B.

The disk control program 315A, upon receiving a split command from the DBMS 17A, sends the split command to the disk control program 315B of the secondary storage subsystem 31B. When the pair state of the primary DB VOL 51A and secondary DB VOL 51B is once again converted to a pair-split state by responding to the split command from the DBMS 17A, the disk control program 315B can notify the subset 600 that the split is complete. In this case, the subset 600 can specify the cancellation of the logless mode to the disk control program 315B. The disk control program 315B, upon receiving a logless mode-cancel from the subset 600, notifies the disk control program 315A to cancel the logless mode. The disk control program 315A responds to this notification, generates a log denoting logless mode-cancel, and writes this log to the primary log VOL 55A. By so doing, the log, in which logless mode-cancel is written, is written to the secondary log VOL 55B.

The preceding is a number of examples of the processing flows carried out from the start to the end of a transaction.

When a failure occurs during a transaction, recovery processing can be performed. At that time, for example, when the failure occurs in the primary DB VOL 51A as shown in FIG. 12A, the DBMS 17A or the disk control program 315A references the primary log VOL 55A, and when there is a logless mode-set log, but no logless mode-cancel log (S20: YES), recovery processing corresponding to the logless mode can be carried out (S22), and when there is no logless mode-set log or logless mode-cancel log (S20: NO), recovery processing corresponding to the log acquisition mode can be carried out. Further, for example, when the primary site fails (or the primary storage subsystem 31A goes down), so-called disaster recovery is carried out, and, as shown in the example given in FIG. 12A, the DBMS 17B or the disk control program 315B references the primary log VOL 55A at that time, and when there is a logless mode-set log, but no logless mode-cancel log (S20: YES), recovery processing corresponding to the logless mode can be carried out (S22), and when there is no logless mode-set log or logless mode-cancel log (S20: NO), recovery processing corresponding to the log acquisition mode can be carried out.

FIG. 12B shows an example of recovery processing corresponding to the logless mode. This recovery processing will be explained hereinbelow in two parts: (A) regarding FIG. 7, and (B) regarding FIGS. 8, 10 and 11.

(A) FIG. 7

When the primary DB VOL 51A fails between the start of a transaction and the start of DB updating, no particular recovery process is carried out. If the primary DB VOL 51A fails subsequent to receiving a notification from the secondary storage subsystem 31B to the effect that asynchronous remote copying of a compulsorily written DB block has been completed, the DBMS 17A or the disk control program 315A can remote copy the secondary DB VOL 51B to the primary storage subsystem 31A, thereby restoring a replica of the secondary DB VOL 51B as the primary DB VOL 51A. Further, for example, when a log denoting logless mode-set is written in the secondary log VOL 55B, and backup of the secondary DB VOL 51B, which was updated using a log of prior thereto, can be acquired, in which case the primary DB VOL 51A can be recovered by remote copying this backup to the primary storage subsystem 31A.

When the primary DB VOL 51A fails between the start and end of DB updating (in other words, during batch processing), the DBMS 17A or the disk control program 315A can remote copy the secondary DB VOL 51B to the primary storage subsystem 31A, thereby recovering a replica of the secondary DB VOL 51B as the primary DB VOL 51A.

When the primary DB VOL 51A fails during re-pairing, the DBMS 17A or the disk control program 315A generates a log denoting logless mode-cancel, and writes this log to the primary log VOL 55A.

When the primary DB VOL 51A fails between the start and finish of the cancellation of the logless mode, the DBMS 17A or the disk control program 315A does not carry out a particular recovery process.

(B) FIG. 8, FIG. 10 and FIG. 11

When the primary DB VOL 51A fails between the start of a transaction and the start of DB updating, no particular recovery process is performed. If the primary DB VOL 51A goes down subsequent to receiving a notification from the secondary storage subsystem 31B to the effect that asynchronous remote copying of a compulsorily written DB block has been completed, the DBMS 17A or the disk control program 315A can remote copy the secondary DB VOL 51B to the primary storage subsystem 31A, thereby recovering a replica of the secondary DB VOL 51B as the primary DB VOL 51A. Further, for example, if a backup of the primary DB VOL 51A or secondary DB VOL 51B has been acquired, this backup can be copied to the primary storage subsystem 31A, thereby recovering the primary DB VOL 51A.

When the primary DB VOL 51A fails between the start and end of DB updating (in other words, during batch processing), the DBMS 17A or the disk control program 315A can copy either a backup of the primary DB VOL 51A, a backup of the secondary DB VOL 51B, or the secondary DB VOL 51B to the primary storage subsystem 31A, thereby recovering a replica as the primary DB VOL 51A.

When the primary DB VOL 51A fails during the re-pairing of FIG. 8, or during the splitting of FIG. 10 and FIG. 11, the DBMS 17A or the disk control program 315A converts the pair state of the primary DB VOL 51A and the secondary DB VOL 51B to the pair-split state (in other words, performs splitting), generates a log denoting logless mode-cancel, and writes this log to the primary log VOL 55A. In addition, a backup of the primary DB VOL 51A or the secondary DB VOL 51B can be copied to the primary storage subsystem 31A, thereby recovering the primary DB VOL 51A.

When the primary DB VOL 51A goes down between the start and finish of the cancellation of the logless mode, the DBMS 17A or the disk control program 315A does not carry out a particular recovery process. A backup of the primary DB VOL 51A, a backup of the secondary DB VOL 51B, or the secondary DB VOL 51B is copied to the primary storage subsystem 31A, thereby recovering the primary DB VOL 51A.

Furthermore, if so-called disaster recovery is carried out when the primary site 30A fails during a transaction in any of the processing flows of FIG. 7, 8, 10, or 11, no particular recovery process needs to be performed. At disaster recovery, for example, the secondary DB VOL 51B can be updated using a log of prior to the log, which denotes logless mode-set (a log written in the DB update history), and this updated secondary DB VOL 51B can be allocated to the write destination of the data outputted by the batch processing of the batch operation program 7. Or, when either updating of the secondary DB VOL 51B has already been completed, or a backup of the secondary DB VOL 51B has been acquired, recovery can be performed using the updated secondary DB VOL 51B or the backup thereof. By carrying out disaster recovery, data, which a client 1 sends via a batch operation, is received by the DBMS 17B, and the DBMS 17B can record this data in a database of the secondary DB VOL 51B.

Thus, in accordance with the above-mentioned embodiment, when a transaction is executed in the logless mode, a log denoting logless mode-start is generated at the start of the transaction, and this log is written to both the primary storage subsystem 31A and the secondary storage subsystem 31B. Further, when a transaction is over, a log denoting transaction-end is generated, and this log is written to both the primary storage subsystem 31A and the secondary storage subsystem 31B. By doing this, when a failure occurs during a transaction, a determination can be made from the latest log as to whether or not this transaction is a logless mode transaction, making it possible to execute recovery processing corresponding to the results of this determination. More specifically, for example, if the latest log is a log denoting the start of the logless mode (a log denoting logless mode-set), a determination can be made that it is a logless mode transaction, and if the latest log is a log denoting the end of the logless mode (a log denoting logless mode-cancel), or a log comprising a DB update history, a determination can be made that the transaction is at a minimum not a logless mode transaction.

Further, according to the above-mentioned embodiment, DB data, which remained in the memory of the primary server 11A from when a log denoting the start of the logless mode was written to the primary storage subsystem 31A until batch processing commenced, without being mirrored to a DB is compulsorily written to this DB. By doing this, a DB in the primary storage subsystem 31A can be made to coincide with a DB recognized by the DBMS 17A.

Further, according to the above-mentioned embodiment, by deftly controlling which function possessed by the primary storage subsystem 31A (as well as by the secondary storage subsystem 31B) is initiated at what point in time during a logless mode transaction, even if a failure should occur during a logless mode transaction, it should be possible to recover the DB as close as possible to the time the failure occurred. These functions, for example, are as follows.

(1) When the pair state of a primary VOL and a secondary VOL is changed to a synchronous/asynchronous pair state, and data is written to the primary VOL, this data is written to the secondary VOL either synchronously or asynchronously thereto.

(2) When the pair state of a primary VOL and a secondary VOL is changed to a pair-split state, even if data is written to the primary VOL, the difference between the primary VOL and the secondary VOL is managed without this data being copied to the secondary VOL.

(3) If a re-pair command is issued when the pair state of a primary VOL and a secondary VOL is a pair-split state, a data group inside the primary VOL and a data group inside the secondary VOL become the same by virtue of the difference between the primary VOL and the secondary VOL being mirrored in the secondary VOL.

The preceding is an explanation of the embodiment of the present invention, but this is merely an example used to explain the present invention, and does not purport to limit the scope of the present invention solely to this embodiment. The present invention can be implemented in a variety of other forms. For example, instead of using the copy mode to control whether copying is carried out synchronously or asynchronously, this can be controlled by the pair state. More specifically, for example, the synchronous/asynchronous pair state can be divided into a synchronous pair state, wherein copying is performed synchronously, and an asynchronous pair state, wherein copying is performed asynchronously.

What is claimed is:

1. A storage control method, which is performed by a storage system comprising a database, wherein said storage system comprises a first storage subsystem and a second storage subsystem, said first storage subsystem comprises a first DB storage device capable of storing a database, and a first log storage device capable of storing a log of said database; and said second storage subsystem comprises a second DB storage device capable of being paired with said first DB storage device, and a second log storage device capable of being paired with said first log storage device, and wherein, said first storage subsystem is constituted such that, when a DB-pair state, which is the pair state of said first DB storage device and said second DB storage device, is a pair-split state, and a difference occurs between said first DB storage device and said second DB storage device, the difference is managed, and when the pair-split state is cancelled, said first storage subsystem, by sending said managed difference to said second storage subsystem, can cause said difference to be updated in said second DB storage device, thereby doing away with the difference between said first DB storage device and said second DB storage device, said storage control method comprising the steps of:

creating, when, as a log control mode which is a mode related to controlling a log of a database, are provided a logless mode, which is a mode in which a log comprising at least the update history of said database is not created even if this database is updated during a transaction, and a mode, which differs from said logless mode, and a transaction is executed in said logless mode, a logless-start log, which is a log denoting the start of said logless mode, at the start of the transaction, and writing the logless-start log to said first log storage device by issuing the logless-start log to said first log storage device;

writing said logless-start log, which is written to said first log storage device, to said second log storage device by sending the logless-start log to said second storage subsystem from said first storage subsystem;

executing DB updating for updating a plurality of times the database of said first DB storage device by issuing a plurality of data respectively to the database;

canceling a pair-split state between said first DB storage device and said second DB storage device either prior to the start or subsequent to the completion of said DB updating while a commenced transaction is being executed;

creating, subsequent to the end of said DB updating, a logless-end log, which is a log denoting the termination of said logless mode, and writing the logless-end log to said first log storage device when the difference between said first DB storage device and said second DB storage device has been done away with; and writing said logless-end log, which is written to said first log storage device, to said second log storage device by sending the logless-end log to said second storage subsystem from said first storage subsystem.

2. The storage control method according to claim 1, wherein a first system, which comprises said first storage subsystem, comprises a database management unit for managing said database, and a first storage controller for controlling copying in accordance with the pair state of the respective storage devices, and said second storage subsystem comprises a second storage controller capable of communicating with said first storage controller;

at least said first storage controller, of said database management unit and said first storage controller, is provided in said first storage subsystem; and prior to the start of a transaction in said logless mode, a log-pair state, which is a pair state between said first log storage device and said second log storage device, constitutes a synchronous/asynchronous pair state in which data written to said first log storage device is transferred to said second log storage device either synchronously or asynchronously with a write to a prescribed region of said first storage subsystem, and wherein said database management unit writes said logless-start log to said first log storage device;

said first storage controller, as said log-pair state constitutes a synchronous/asynchronous pair state, sends said logless-start log, which is written to said first log storage device, to said second storage controller, and said second storage controller writes the logless-start log from said first storage controller to said second log storage device;

said database management unit executes said DB updating;

said database management unit cancels a pair-split state between said first DB storage device and said second DB storage device either prior to the start or subsequent to the completion of said DB updating while a transaction-in-progress is being executed;

said database management unit, subsequent to the end of said DB updating, creates a logless-end log, which is a log denoting the termination of said logless mode, and writes the logless-end log to said first log storage device when the difference between said first DB storage device and said second DB storage device has been done away with; and said first storage controller, as said log-pair state constitutes a synchronous/asynchronous pair state, sends said logless-end log, which is written to said first log storage device, to said second storage controller, and said second storage controller writes the logless-end log from said first storage controller to said second log storage device.

3. The storage control method according to claim 2, wherein, between the start and end of a transaction in said logless mode, at least said logless-start log and said logless-end log are transferred to said second log storage device synchronously with a write to a prescribed region of said first storage subsystem.

4. The storage control method according to claim 1, wherein, when data written to said database is temporarily stored in memory, and said database is updated by writing the data stored in this memory to said first DB storage device, after said logless-start log has been issued to said first log storage device, unmirrored data, which is data that is not written to said database prior to the start of said DB updating, is written to said first DB storage device from said memory, and said DB updating is commenced subsequent to completion of the the write.

5. The storage control method according to claim 4, wherein, when said DB-pair state constitutes a synchronous/asynchronous pair state in which data written to said first DB storage device is transferred to said second DB storage device either synchronously or asynchronously with a write to a prescribed region of said first storage subsystem, said logless-start log is written to said first log storage device;

said unmirrored data is written from memory to said first DB storage device, and said unmirrored data, which is thereby written to said first DB storage device, is sent from said first storage subsystem to said second storage subsystem, and written to said second log storage device;

said DB-pair state is converted from the synchronous/asynchronous pair state to said pair-split state subsequent to said unmirrored data being written to both said first log storage device and said second log storage device;

said DB updating is started after said DB-pair state has been changed to said pair-split state;

the pair-split state of said DB-pair state is cancelled subsequent to completion of said DB updating; and said logless-end log is written to said first log storage device subsequent to completion of updating of said difference to said second DB storage device in accordance with the cancellation of said pair-split state.

6. The storage control method according to claim 4, wherein, when said DB-pair state constitutes said pair-split state, said logless-start log is written to said first log storage device;

said unmirrored data is written from said memory to said first DB storage device;

a log written to said second log storage device, prior to the logless-start log, is used prior to the start of said DB updating, said second DB storage device database is updated, and a backup of the updated second DB storage device is acquired by said second storage subsystem;

the pair-split state of said DB-pair state is canceled subsequent to completion of said DB updating; and said logless-end log is written to said first log storage device subsequent to completion of updating of said difference to said second DB storage device in accordance with the cancellation of said pair-split state.

7. The storage control method according to claim 6, wherein, subsequent to said unmirrored data being written from said memory to said first DB storage device, a backup of said first DB storage device, in which said unmirrored data is mirrored, is acquired by said first storage subsystem prior to the commencement of said DB updating.

8. The storage control method according to claim 4, wherein, when said DB-pair state constitutes said pair-split state, said logless-start log is written to said first log storage device;

said unmirrored data is written from said memory to said first DB storage device;

the pair-split state of said DB-pair state is canceled;

said DB updating is commenced subsequent to completion of updating of said difference to said second DB storage device in accordance with the cancellation of said pair-split state; and subsequent to completion of said DB updating, said DB-pair state is once again converted to said pair-split state, and thereafter, said logless-end log is written to said first log storage device.

9. The storage control method according to claim 8, wherein, after said DB-pair state is once again converted to said pair-split state subsequent to the completion of said DB updating, said second storage subsystem requests that said first storage subsystem cancel the logless mode, and said first storage subsystem writes said logless-end log to said first log storage device in accordance with the request.

10. The storage control method according to claim 1, wherein, when said first DB storage device fails, if said logless-start log is stored in either said first log storage device or said second log storage device, but said logless-end log is not stored in either said first log storage device or said second log storage device, the database, which is stored in said first DB storage device, is recovered as close as possible to the point in time of said failure by executing recovery processing corresponding to said logless mode.

11. A database management system for managing a database provided in a storage system,
   wherein said storage system comprises a first storage subsystem and a second storage subsystem,
   said first storage subsystem comprises a first DB storage device capable of storing a database, a first log storage device capable of storing a log of said database, and a first storage controller for controlling copying in accordance with the pair state of the respective storage devices; and
   said second storage subsystem comprises a second DB storage device capable of being paired with said first DB storage device, a second log storage device capable of being paired with said first log storage device, and a second storage controller capable of communicating with said first storage controller,
   and wherein, said first storage subsystem is constituted such that, when a DB-pair state, which is the pair state of said first DB storage device and said second DB storage device, is a pair-split state, and a difference occurs between said first DB storage device and said second DB storage device, the difference is managed, and when the pair-split state is cancelled, said first storage controller, by sending said managed difference to said second storage controller, can cause said second storage controller to update said difference in said second DB storage device, thereby doing away with the difference between said first DB storage device and said second DB storage device, and
   prior to the start of a transaction, a log-pair state, which is a pair state between said first log storage device and said second log storage device, constitutes a synchronous/asynchronous pair state in which data written to said first log storage device is transferred to said second log storage device either synchronously or asynchronously with a write to a prescribed region of said first storage subsystem, and by so doing, when data is written to said first log storage device, said first storage controller sends the data to said second storage controller, and said second storage controller writes the data to said second log storage device,
   said database management system, when, as a log control mode, which is a mode related to controlling a log of a database, are provided a logless mode, which is a mode in which a log comprising at least database update history is not created even if said database is updated during a transaction, and a mode, which differs from said logless mode, and a transaction is executed in said logless mode, creates at the start of this transaction a logless-start log, which is a log denoting the start of said logless mode, and issues the logless-start log to said first log storage device, thereby writing the logless-start log to said first log storage device; and executes DB updating by which a plurality of data are respectively issued to a database of said first DB storage device; and issues to said first storage subsystem a pair command for canceling a pair-split state between said first DB storage device and said second DB storage device either prior to the start or subsequent to the completion of said DB updating while a transaction-in-progress is being executed, thereby canceling this pair-split state; and when the difference between said first DB storage device and said second DB storage device has been done away with subsequent to the end of said DB updating, creates a logless-end log, which is a log denoting the termination of said logless mode, and issues this logless-end log to said first log storage device, thereby writing this logless-end log to said first log storage device.

12. The database management system according to claim 11, wherein data, which is to be written to said database, is temporarily stored in a memory, and said database is updated by issuing the data stored in this memory to said first DB storage device, and subsequent to issuing said logless-start log to said first log storage device, unmirrored data, which is data not written to said database prior to the commencement of said DB updating, is written from this memory to said first DB storage device, and said DB updating is commenced subsequent to the write being completed.

13. The database management system according to claim 12, wherein, when said DB-pair state constitutes a synchronous/asynchronous pair state in which data to be written to said first DB storage device is transferred to said second DB storage device either synchronously or asynchronously with a write to a prescribed region of said first storage subsystem, said unmirrored data is written from said memory to said first DB storage device subsequent to said logless-start log being issued to said first log storage device;
   a split command for converting said DB-pair state from a synchronous/asynchronous pair state to said pair-split state is issued subsequent to said unmirrored data being written to both said first log storage device and said second log storage device to said first storage subsystem, thereby converting the DB-pair state to a pair-split state;
   said DB updating is commenced after said DB-pair state has been converted to said pair-split state;
   said pair command for canceling the pair-split state of said DB-pair state is issued to said first storage subsystem subsequent to completion of said DB updating; and
   said logless-end log is issued to said first log storage device subsequent to completion of updating of said difference to said second DB storage device in accordance with the cancellation of said pair-split state.

14. The database management system according to claim 12, wherein, when said DB-pair state constitutes said pair-split state, said unmirrored data is written from said memory to said first DB storage device subsequent to said logless-start log being issued to said first log storage device;
   said pair command for canceling the pair-split state of said DB-pair state is issued to said first storage subsystem after the end of said DB updating; and
   said logless-end log is issued to said first log storage device subsequent to completion of updating of said difference to said second DB storage device in accordance with the cancellation of said pair-split state.

15. The database management system according to claim 12, wherein, when said DB-pair state constitutes said pair-split state, said unmirrored data is written from said memory to said first DB storage device subsequent to said logless-start log being issued to said first log storage device;
   said pair command for canceling the pair-split state of said DB-pair state is issued to said first storage subsystem;
   said DB updating is commenced subsequent to completion of updating of said difference to said second DB storage device in accordance with the cancellation of said pair-split state; and
   a split command for converting said DB-pair state once again to said pair-split state is issued to said first storage subsystem after the end of said DB updating, and said logless-end log is issued to said first log storage device subsequent to said DB-pair state being converted to a pair-split state.

16. A database management method for managing a database provided in a storage system;

wherein said storage system comprises a first storage subsystem and a second storage subsystem;

said first storage subsystem comprises a first DB storage device capable of storing a database, a first log storage device capable of storing a log of said database, and a first storage controller for controlling copying in accordance with the pair state of the respective storage devices; and said second storage subsystem comprises a second DB storage device capable of being paired with said first DB storage device, a second log storage device capable of being paired with said first log storage device, and a second storage controller capable of communicating with said first storage controller, and wherein, said first storage subsystem is constituted such that, when a DB-pair state, which is the pair state of said first DB storage device and said second DB storage device, is a pair-split state, and a difference occurs between said first DB storage device and said second DB storage device, the difference is managed, and when the pair-split state is cancelled, said first storage controller, by sending said managed difference to said second storage controller, can cause said second storage controller to update said difference in said second DB storage device, thereby doing away with the difference between said first DB storage device and said second DB storage device, and prior to the start of a transaction, a log-pair state, which is a pair state between said first log storage device and said second log storage device, constitutes a synchronous/asynchronous pair state in which data to be written to said first log storage device is transferred to said second log storage device either synchronously or asynchronously with a write to a prescribed region of said first storage subsystem, and by so doing, when data is written to said first log storage device, said first storage controller sends the data to said second storage controller, and said second storage controller writes the data to said second log storage device, said database management method comprising the steps of:

creating, when, as a log control mode, which is a mode related to controlling a log of a database, are provided a logless mode, which is a mode in which a log comprising at least database update history is not created even if said database is updated during a transaction, and a mode, which differs from said logless mode, and a transaction is executed in said logless mode, at the start of the transaction a logless-start log, which is a log denoting the start of said logless mode, and issuing said logless-start log to said first log storage device, thereby writing this logless-start log to said first log storage device;

executing DB updating by which a plurality of data are respectively issued to a database of said first DB storage device;

issuing to said first storage subsystem a pair command for canceling a pair-split state between said first DB storage device and said second DB storage device either prior to the start or subsequent to the completion of said DB updating while a transaction-in-progress is being executed, thereby canceling this pair-split state; and creating a logless-end log, which is a log denoting the termination of said logless mode, and issuing said logless-end log to said first log storage device when the difference between said first DB storage device and said second DB storage device has been done away with subsequent to the end of said DB updating, thereby writing this logless-end log to said first log storage device.

17. A computer for managing a database provided in a storage system, wherein said storage system comprises a first storage subsystem and a second storage subsystem;

said first storage subsystem comprises a first DB storage device capable of storing a database, a first log storage device capable of storing a log of said database, and a first storage controller for controlling copying in accordance with the pair state of the respective storage devices, and said second storage subsystem comprises a second DB storage device capable of being paired with said first DB storage device, a second log storage device capable of being paired with said first log storage device, and a second storage controller capable of communicating with said first storage controller, and wherein said first storage subsystem is constituted such that, when a DB-pair state, which is the pair state of said first DB storage device and said second DB storage device, is a pair-split state, and a difference occurs between said first DB storage device and said second DB storage device, the difference is managed, and when the pair-split state is cancelled, said first storage controller, by sending said managed difference to said second storage controller, can cause said second storage controller to update said difference in said second DB storage device, thereby doing away with the difference between said first DB storage device and said second DB storage device, and prior to the start of a transaction, a log-pair state, which is a pair state between said first log storage device and said second log storage device, constitutes a synchronous/asynchronous pair state in which data to be written to said first log storage device is transferred to said second log storage device either synchronously or asynchronously with a write to a prescribed region of said first storage subsystem, and by so doing, when data is written to said first log storage device, said first storage controller sends the data to said second storage controller, and said second storage controller writes the data to said second log storage device, said computer comprising:

a logless-start log issuing unit, which, when, as a log control mode, which is a mode related to controlling a log of a database, are provided a logless mode, which is a mode in which a log comprising at least database update history is not created even if said database is updated during a transaction, and a mode, which differs from said logless mode, and a transaction is executed in said logless mode, creates at the start of this transaction a logless-start log, which is a log denoting the start of said logless mode, and issues said logless-start log to said first log storage device;

a DB operation unit for executing DB updating by which a plurality of data are respectively issued to a database of said first DB storage device;

a pair command unit for issuing to said first storage subsystem a pair command for canceling a pair-split state between said first DB storage device and said second DB storage device either prior to the start or subsequent to the completion of said DB updating while a transaction-in-progress is being executed; and a logless-end log issuing unit, which, when the difference between said first DB storage device and said second DB storage device has been done away with subsequent to the end of said DB updating, creates a logless-end log, which is a log denoting the termination of said logless mode, and issues the logless-end log to said first log storage device.

18. A storage subsystem capable of communicating with an external storage subsystem, the storage subsystem comprising:

a first DB storage device capable of storing a database;

a first log storage device capable of storing a log of said database; and a controller, wherein said external storage subsystem comprises a second DB storage device capable of being paired with said first DB storage device, and a second log storage device capable of being paired with said first log storage device; and said controller is constituted such that, when a DB-pair state, which is the pair state of said first DB storage device and said second DB storage device, is a pair-split state, and a difference occurs between said first DB storage device and said second DB storage device, the difference is managed, and when the pair-split state is cancelled, said first storage controller, by sending said managed difference to said second storage controller, can cause said second storage controller to update said difference in said second DB storage device, thereby doing away with the difference between said first DB storage device and said second DB storage device, and prior to the start of a transaction, a log-pair state, which is a pair state between said first log storage device and said second log storage device, constitutes a synchronous/asynchronous pair state in which data to be written to said first log storage device is transferred to said second log storage device either synchronously or asynchronously with a write to a prescribed region of said first storage subsystem, and by so doing, when data is written to said first log storage device, said controller sends the data to said external storage subsystem so that the data is written to said second log storage device, said controller, when, as a log control mode, which is a mode related to controlling a log of a database, are provided a logless mode, which is a mode in which a log comprising at least database update history is not created even if said database is updated during a transaction, and a mode, which differs from said logless mode, and a transaction is executed in said logless mode, creates at the start of the transaction a logless-start log, which is a log denoting the start of said logless mode, and writes said logless-start log to said first log storage device; and executes DB updating by which a plurality of data are respectively issued to a database of said first DB storage device; and cancels a pair-split state between said first DB storage device and said second DB storage device either prior to the start or subsequent to the completion of said DB updating while a transaction-in-progress is being executed; and creates a logless-end log, which is a log denoting the termination of said logless mode, and writes the logless-end log to said first log storage device when the difference between said first DB storage device and said second DB storage device has been done away with subsequent to the end of said DB updating.

* * * * *